(12) United States Patent
Shang et al.

(10) Patent No.: US 12,198,216 B2
(45) Date of Patent: Jan. 14, 2025

(54) METHOD AND SYSTEM FOR CONSTRUCTING VIRTUAL ENVIRONMENT FOR RIDE-HAILING PLATFORMS

(71) Applicant: Beijing DiDi Infinity Technology and Development Co., Ltd., Beijing (CN)

(72) Inventors: Wenjie Shang, Beijing (CN); Qingyang Li, Mountain View, CA (US); Zhiwei Qin, Mountain View, CA (US); Jieping Ye, Beijing (CN); Yang Yu, Nanjing (CN); Yiping Meng, Beijing (CN)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 1017 days.

(21) Appl. No.: 17/058,407

(22) PCT Filed: May 14, 2020

(86) PCT No.: PCT/CN2020/090215
§ 371 (c)(1),
(2) Date: Nov. 24, 2020

(87) PCT Pub. No.: WO2021/226925
PCT Pub. Date: Nov. 18, 2021

(65) Prior Publication Data
US 2022/0138887 A1    May 5, 2022

(51) Int. Cl.
*G06Q 50/40* (2024.01)
*G06N 20/00* (2019.01)
(Continued)

(52) U.S. Cl.
CPC ............ *G06Q 50/40* (2024.01); *G06N 20/00* (2019.01); *G06Q 10/067* (2013.01); *G06Q 30/0207* (2013.01)

(58) Field of Classification Search
CPC .. G06Q 50/40; G06Q 10/067; G06Q 30/0207; G06N 20/00
See application file for complete search history.

(56) References Cited

U.S. PATENT DOCUMENTS

| 11,017,688 B1 * | 5/2021 | Arazi ................... H04W 4/029 |
| 2009/0048938 A1 * | 2/2009 | Dupray ............. G06Q 30/0641 |
| | | 705/27.1 |

(Continued)

FOREIGN PATENT DOCUMENTS

| CN | 105117777 A | 12/2015 |
| CN | 108520452 A | 9/2018 |
| CN | 111052158 A | 4/2020 |

OTHER PUBLICATIONS

Shuo Ma, Real-Time City-Scale Taxi Ridesharing, 2014, p. 1782-1785 (Year: 2014).*
(Continued)

*Primary Examiner* — Ibrahim N El-Bathy
(74) *Attorney, Agent, or Firm* — Sheppard Mullin Richter & Hampton LLP

(57) ABSTRACT

Methods, systems, and apparatus, including computer programs encoded on computer storage media, for constructing a virtual environment for a ride-hailing platform are disclosed. An exemplary method comprises: obtaining a plurality of historical interaction trajectories each comprising one or more interaction records between a driver and a ride-hailing platform, each interaction record comprising a program recommendation of the ride-hailing platform to the driver and a reaction of the driver in response to the program recommendation; training a simulator based on the plurality of historical interaction trajectories; and integrating a reward function with the simulator to construct the virtual environment, wherein the plurality of first program recommendations and the plurality of reactions form a plurality of (Continued)

simulated interactions, and a data distribution of the plurality of simulated interactions approximates a data distribution of a plurality of interaction records in the plurality of historical interaction trajectories.

17 Claims, 9 Drawing Sheets

(51) Int. Cl.
G06Q 10/067 (2023.01)
G06Q 30/0207 (2023.01)

(56) References Cited

U.S. PATENT DOCUMENTS

| | | | | |
|---|---|---|---|---|
| 2009/0063274 | A1* | 3/2009 | Dublin, III | G06Q 30/02 705/14.1 |
| 2009/0164321 | A1* | 6/2009 | Vasilakos | G06Q 30/02 705/14.1 |
| 2009/0182630 | A1* | 7/2009 | Otto | G06Q 20/206 705/14.1 |
| 2017/0234688 | A1 | 8/2017 | Abhishek | |
| 2017/0364795 | A1* | 12/2017 | Anderson | G06N 20/10 |
| 2020/0151640 | A1 | 5/2020 | Chen et al. | |
| 2023/0245651 | A1* | 8/2023 | Wang | G06N 5/022 704/275 |

OTHER PUBLICATIONS

Brenna D. Argall et al., "A survey of robot learning from demonstration", Robotics and Autonomous System, vol. 57, 2009, pp. 469-483.

Susan Athey et al. "Machine Learning Methods for Estimating Heterogeneous Casual Effects", arXiv:1504.01132v1, [stat.ML] Apr. 5, 2015, pp. 1-24.

Elias Bareinboim et al., "Bandits with Unobserved Confounders: A Casual Approach", Accepted to the Neural Information Processing Systems (NIPS) Conference, Technical Report R-460, Nov. 2015, 9 pages.

Noam Brown et al., "Safe and Nested Subgame Solving for Imperfect-Information Games", 31st Conference on Neural Information Processing Systems (NIPS 2017), Long Beach, CA, arXiv:1705.02955v3 [cs.AI] Nov. 16, 2017, 22 pages.

Tianqi Chen et al., "XGBoost: A Scalable Tree Boosting System", arXiv:1603.02754v1 [cs.LG] Mar. 9, 2016, 13 pages.

Xinshi Chen et al., "Generative Adversarial User Model for Reinforcement Learning Based Recommendation System", Proceedings of the 36th International Conference on Machine Learning, Long Beach, CA, PMLR 97, 2019, arXiv:1812.10613v3 [cs.LG] Jan. 1, 2020, 15 pages.

Chelsea Finn et al., "A Connection Between Generative Adversarial Networks, Inverse Reinforcement Learning, and Energy-Based Models", arXiv:1611.03852v3 [cs.LG] Nov. 25, 2016, 10 pages.

Andrew Forney et al., "Counterfactual Data-Fusion for Online Reinforcement Learners", Proceedings of the 34th International Conference on Machine Learning, Sydney. Australia, PMLR 70, 2017, Technical Report R-26, Jun. 2017, 9 pages.

Ian J. Goodfellow et al., "Generative Adversarial Nets", arXiv:1406.2661v1 [stat.ML] Jun. 10, 2014, pp. 1-9.

Leo Guelman et al., "Optimal personalized treatment rules for marketing interventions: A review of methods, a new proposal, and an insurance case study", UB Riskcenter Working Paper Series, Working paper Jun. 2014, Research Group on Risk in Insurance and Finance, www.ub.edu/riskcenter, 33 pages.

Pierre Gutierrez et al., "Casual Inference and Uplift Modeling A review of the Literature", JMLR: Workshop and Conference Proceedings 67, 2016, pp. 1-13.

Behram Hansotia et al., "Incremental Value Modeling", Journal of Interactive Marketing, vol. 16, No. 3, Summer 2002.

Jonathan Ho et al, "Generative Adversarial Imitation Learning", 30th Conference on Neural Information Processing Systems (NIPS 2016), Barcelona, Spain, 14 pages.

Maciej Jaskowski et al., "Uplift modeling for clinical trial data", Appearing in the ICML 2012 Workshop on Clinical Data Analysis, Edinburgh, Scotland, UK, 2012, 8 pages.

Fredrik D. Johansson et al., "Learning Representations for Counterfactual Inference", Proceedings of the 33rd International Conference on Machine Learning, New York, NY, 2016, JMLR: W&CP vol. 48, 10 pages.

Victor S.Y. Lo, "The True Lift Model—A Novel Data Mining Approach to Response Modeling in Database Marketing", SIGKDD Explorations, vol. 4, Issue 2, Dec. 2002, pp. 78-86.

Christos Louizoa et al., "Casual Effect Inference with Deep Latent-Variable Models", arXiv:1705.08821v1 [stat.ML] May 24, 2017, pp. 1-12.

Chaochao Lu et al., "Deconfounding Reinforcement Learning in Observational Settings", arXiv:1812.10576v1 [cs.LG] Dec. 26, 2018, pp. 1-30.

Jacob Menick et al., "Generating High Fidelity Images with Subscale Pixel Networks and Multidimensional Upscaling", arXiv:1812.01608v1 [cs.CV] Dec. 4, 2018, pp. 1-15.

Volodymyr Mnih et al., "Human-level control through deep reinforcement learning", Research Letter, Nature, vol. 518, Feb. 26, 2015, pp. 529-533.

Houssam Nassif et al., "Uplift Modeling with ROC: An SRL Case Study", Appears in the Proc. of International Conference on Inductive Logic Programming (ILP'13), Rio de Janeiro, Brazil, 2013.

Christopher Berner et al., "Dota 2 with Large Scale Deep Reinforcement Learning", arXiv:1912.06680v1 [cs.LG] Dec. 13, 2019, https://openai.com/bibtex/openai2019dota.bib, pp. 1-66.

Judea Pearl, "Causal inference in statistics: An overview", Statistics Survey, vol. 3, 2009, pp. 96-146, Technical Report R-350, Sep. 2009.

Dean A. Pomerleau, "Efficient Training of Artificial Neural Networks for Autonomous Navigation", Neural Computation 3:1, 1991, pp. 88-97.

Nicholas J. Radcliffe, "Using Control Groups to Target on Predicted Lift: Building and Assessing Uplift Models", 2007, 14 pages.

Nicholas J. Radcliffe et al., "Real World Uplift Modeling with Significance-Based Uplift Trees", Portrait Technical Report TR-2011-1, Stochastic Solutions White Paper, 2011, pp. 1-33.

Paul R. Rosenbaum et al., "The central role of the propensity score in observational studies for casual effects", Biometrika, vol. 70, 1983, pp. 41-55.

Stephane Ross et al., "A Reduction of Imitation Learning and Structured Prediction to No-Regret Online Learning", Appearing in Proceedings of the 14th International Conference on Artificial Intelligence and Statistics (AISTATS) 2011, Fort Lauderdale, FL, vol. 15 of JMLR: W&CP 15, pp. 627-635.

Stuart Russell, "Learning agents for uncertain environments (extended abstract)", Proceedings of the 11th Annual Conference on Computational Learning Theory, Jul. 1998, pp. 101-103.

Piotr Rzepakowski et al., "Decision trees for uplift modeling with single and multiple treatments", Knowl Inf Syst, vol. 32, 2012, pp. 303-327.

Stefan Schaal, "Is imitation learning the route to humanoid robots?", Trends in Cognitive Sciences, vol. 3, No. 6, Jun. 1999, pp. 233-242.

John Schulman et al., "Trust Region Policy Optimization", Proceedings of the 31st International Conference on Machine Learning, Lille, France, 2015. JMLR: W&CP vol. 37, 9 pages.

Jing-Cheng Shi et al., "Virtual-Taobao: Virtualizing Real-world Online Retail Environment for Reinforcement Learning", arXiv:1805.10000v1 [cs.AI] May 25, 2018, pp. 1-15.

David Silver et al., "Mastering the Game of Go with Deep Neural Networks and Tree Search", Nature, vol. 529, Jan. 28, 2016, pp. 484-489.

Xiaogang Su et al., "Facilitating Score and Causal Inference Trees for Large Observational Studies", Journal of Machine Learning Research, vol. 13, 2012, pp. 2955-2994.

(56) References Cited

OTHER PUBLICATIONS

Stefan Wager et al., "Estimation and Inference of Heterogeneous Treatment Effects using Random Forests", Journal of the American Statistical Association, vol. 113, No. 523, 2018, pp. 1228-1242, Theory and Methods.
Lukasz Zaniewicz et al., "Support Vector Machines for Uplift Modeling", Proceedings of the 2013 IEEE 13th International Conference on Data Mining Workshops, Dec. 2013, pp. 131-138.
Peng Zhao et al., "Handling Concept Drift via Model Reuse", arXiv:1809.02804v1 [cs.LG] Sep. 8, 2018, pp. 1-33.
PCT International Search Report and the Written Opinion mailed Feb. 18, 2021, issued in related International Application No. PCT/CN2020/090215 (9 pages).

* cited by examiner

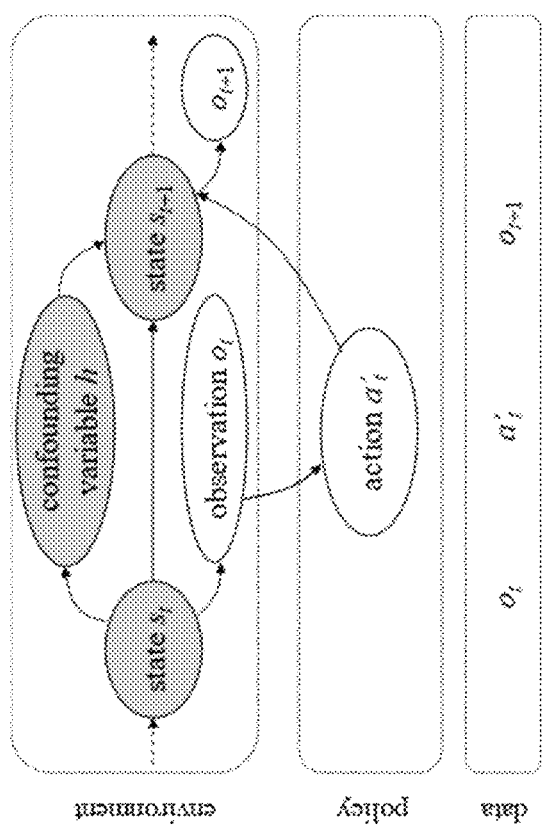
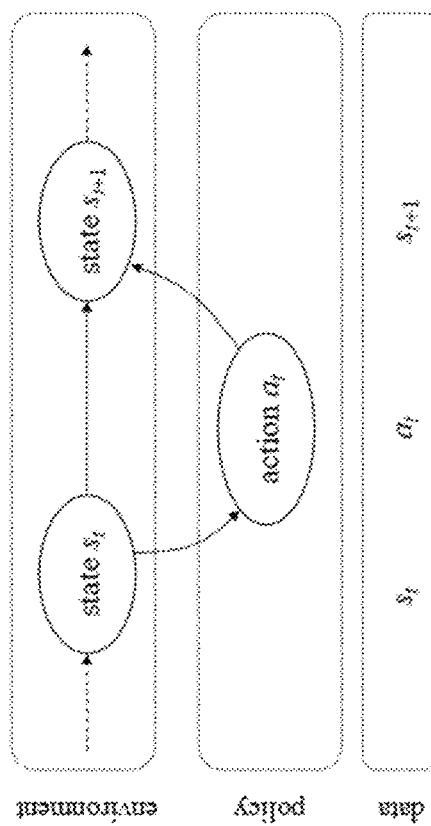
FIG.1A

700

720 — obtaining a plurality of historical interaction trajectories each comprising one or more interaction records between a driver and a ride-hailing platform, each interaction record comprising a program recommendation by the ride-hailing platform to the driver and a reaction of the driver in response to the program recommendation 730 — training a simulator based on the plurality of historical interaction trajectories, wherein the simulator comprises: a platform policy for generating a plurality of first program recommendations by a virtual ride-hailing platform, a confounding policy for generating a plurality of second program recommendations based on the plurality of first program recommendations and a plurality of confounding variables, and a driver policy for generating a plurality of reactions of a plurality of virtual drivers based on the plurality of first program recommendations and the plurality of second program recommendations, and wherein the plurality of first program recommendations and the plurality of reactions form a plurality of simulated interactions between the plurality of virtual drivers and the virtual ride-hailing platform, and a data distribution of the plurality of simulated interactions approximates a data distribution of a plurality of interaction records in the plurality of historical interaction trajectories.

740 — integrating a reward function with the simulator to construct the virtual environment

FIG. 7

METHOD AND SYSTEM FOR CONSTRUCTING VIRTUAL ENVIRONMENT FOR RIDE-HAILING PLATFORMS

TECHNICAL FIELD

The disclosure relates generally to systems and methods for reinforcement learning, in particular, constructing a virtual environment for optimizing or evaluating driver incentive program recommendation policies in a ride-hailing environment.

BACKGROUND

On-demand ride-hailing services have seen rapid expansion in recent years. In this economic pattern, a ride-hailing platform often needs to develop potential product and operational solutions that may guide supply and demand towards geo-temporal alignment and a better user experience. One popular way involves recommending various programs to drivers, in order to incentivize them to reposition to places with higher ride demand or to finish more rides. Specifically, a ride-hailing platform may select an appropriate program to recommend the drivers, and then adjust the program content according to the drivers' feedback behavior. This is a typical sequential recommendation task and may be naturally solved by reinforcement learning (RL). However, the high trial-and-error cost of RL makes it impractical to train the program recommendation policies in a real ride-hailing environment. In addition, the behavior of drivers may not only be influenced by the recommended programs, but also by some other unobservable factors in the ride-hailing environment at the moment (e.g., hidden confounders). Therefore, it is desirable to construct a virtual environment that recovers the key dynamics (both observable and unobservable factors) of the real-world environment, so that driver incentive program recommendation policies may be trained in the virtual environment with RL.

SUMMARY

Various embodiments of the present specification may include systems, methods, and non-transitory computer readable media for constructing a virtual environment for a ride-hailing platform.

According to one aspect, the method for constructing a virtual environment for a ride-hailing platform may comprise: obtaining a plurality of historical interaction trajectories each comprising one or more interaction records between a driver and a ride-hailing platform, each interaction record comprising a program recommendation of the ride-hailing platform to the driver and a reaction of the driver in response to the program recommendation; training a simulator based on the plurality of historical interaction trajectories; and integrating a reward function with the simulator to construct the virtual environment, wherein the simulator comprises: a platform policy for generating a plurality of first program recommendations by a virtual ride-hailing platform, a confounding policy for generating a plurality of second program recommendations based on the plurality of first program recommendations and a plurality of confounding variables, and a driver policy for generating a plurality of reactions of a plurality of virtual drivers based on the plurality of first program recommendations and the plurality of second program recommendations, and wherein the plurality of first program recommendations and the plurality of reactions form a plurality of simulated interactions between the plurality of virtual drivers and the virtual ride-hailing platform, and a data distribution of the plurality of simulated interactions approximates a data distribution of a plurality of interaction records in the plurality of historical interaction trajectories.

In some embodiments, the integrating a reward function with the simulator comprises: obtaining a plurality of control-treatment data sets from randomized trial experiments in the ride-hailing platform; training an uplift inference network based on the plurality of control-treatment data sets, wherein the trained uplift inference network infers a plurality of uplifts corresponding to the plurality of first program recommendations in response to a given driver state, each of the uplifts indicating a reward difference between (1) the virtual ride-hailing platform not making the corresponding first program recommendation in response to the given driver state and (2) the virtual ride-hailing platform making the corresponding first program recommendation in response to the given driver state; and integrating the trained uplift inference network as the reward function with the simulator to construct the virtual environment.

In some embodiments, the control-treatment data set comprises a plurality of treatment data entries and a plurality of control data entries, the plurality of treatment data entries comprising a plurality of rewards for the ride-hailing platform making one or more program recommendations, and the plurality of control data entries comprising a plurality of rewards for the ride-hailing platform not making the one or more program recommendations.

In some embodiments, the uplift inference network comprises a feature extraction subnetwork for extracting a plurality of features from an input driver state, and an uplift inference subnetwork for inferring an uplift for a first program recommendation in response to the input driver state.

In some embodiments, the uplift inference subnetwork comprises a treatment branch and a control branch, and the training an uplift inference network comprises: training the feature extraction subnetwork and the treatment branch based on the control-treatment data set; and training the feature extraction subnetwork and the control branch based on the control-treatment data set.

In some embodiments, the method further comprises optimizing a candidate platform policy in the virtual environment by: determining an initial driver state; determining, based on the initial driver state, a simulated interaction between a virtual driver and the virtual ride-hailing platform according to the simulator, wherein the simulated interaction comprises a program recommendation from the virtual ride-hailing platform; determining a reward for the program recommendation from the virtual ride-hailing platform according to the reward function in the virtual environment; optimizing one or more parameters of the candidate platform policy based on the reward; and transitioning the initial driver state to a new driver state based on the simulated interaction.

In some embodiments, the initial driver state comprises at least one of following driver features at a time step: gender, age, tenure on the ride-hailing platform, and recent activities on the ride-hailing platform.

In some embodiments, the plurality of confounding variables comprise one or more of: location information, weather information, event information, holidays, and a competitor's policy.

In some embodiments, the confounding policy and the driver policy are trained jointly as a confounder-driver policy, and the training a simulator comprises: training a discriminator to determine a probability that a state-action pair is from the data distribution of the plurality of interaction records in the plurality of historical interaction trajectories; initializing the platform policy and the confounder-driver policy to form a multi-agent generator; inputting a driver state of a virtual driver to the multi-agent generator to generate a simulated interaction record according to the platform policy and the confounder-driver policy; determining a first state-action pair and a second state-action pair from the simulated interaction record; determining, based on the discriminator and the first state-action pair, a first reward for the platform policy; determining, based on the discriminator and the second state-action pair, a second reward for the confounder-driver policy; and optimizing the platform policy and the confounder-driver policy according to the first reward and the second reward, respectively.

In some embodiments, the training a simulator further comprises: obtaining a simulated interaction trajectory generated by the multi-agent generator; and updating one or more parameters of the discriminator based on the simulated interaction trajectory to minimize a first loss function corresponding to the platform policy and a second loss function corresponding to the confounder-driver policy.

In some embodiments, the inputting a driver state to the multi-agent generator to generate a simulated interaction record comprises: generating, according to the platform policy and the driver state, a third program recommendation; generating, according to the confounding policy, a fourth program recommendation based on (1) the driver state and (2) the third program recommendation; generating, according to the driver policy, a reaction of the virtual driver based on (1) the driver state, (2) the third program recommendation, and (3) the fourth program recommendation; and obtaining a simulated interaction record comprising the driver state, the third program recommendation, and the reaction.

In some embodiments, the first state-action pair comprises a first state and a first action; the second state-action pair comprises a second state and a second action, and determining the first state-action pair and the second state-action pair from the simulated interaction record comprises: for the first state-action pair, determining the driver state as the first state, and the third program recommendation as the first action; and for the second state-action pair, determining the driver state and the third program recommendation jointly as the second state, and the reaction of the virtual driver as the second action.

In some embodiments, the method further comprises evaluating a candidate platform policy in the virtual environment by: determining an initial driver state; determining, based on the initial driver state, a simulated interaction trajectory between a virtual driver and the virtual ride-hailing platform according to the simulator; obtaining a plurality uplifts for the plurality of first program recommendations by the virtual ride-hailing platform in the simulated interaction trajectory; and determining a score of the candidate platform policy based on the plurality of uplifts.

According to another aspect, a system for constructing a virtual environment for a ride-hailing platform may comprise one or more processors and one or more non-transitory computer-readable memories coupled to the one or more processors and configured with instructions executable by the one or more processors to cause the system to perform operations comprising: obtaining a plurality of historical interaction trajectories each comprising one or more interaction records between a driver and a ride-hailing platform, each interaction record comprising a program recommendation of the ride-hailing platform to the driver and a reaction of the driver in response to the program recommendation; training a simulator based on the plurality of historical interaction trajectories; and integrating a reward function with the simulator to construct the virtual environment, wherein the simulator comprises: a platform policy for generating a plurality of first program recommendations by a virtual ride-hailing platform, a confounding policy for generating a plurality of second program recommendations based on the plurality of first program recommendations and a plurality of confounding variables, and a driver policy for generating a plurality of reactions of a plurality of virtual drivers based on the plurality of first program recommendations and the plurality of second program recommendations, and wherein the plurality of first program recommendations and the plurality of reactions form a plurality of simulated interactions between the plurality of virtual drivers and the virtual ride-hailing platform, and a data distribution of the plurality of simulated interactions approximates a data distribution of a plurality of interaction records in the plurality of historical interaction trajectories.

According to yet another aspect, a non-transitory computer-readable storage medium for constructing a virtual environment for a ride-hailing platform, may be configured with instructions executable by one or more processors to cause the one or more processors to perform operations comprising: obtaining a plurality of historical interaction trajectories each comprising one or more interaction records between a driver and a ride-hailing platform, each interaction record comprising a program recommendation of the ride-hailing platform to the driver and a reaction of the driver in response to the program recommendation; training a simulator based on the plurality of historical interaction trajectories; and integrating a reward function with the simulator to construct the virtual environment, wherein the simulator comprises: a platform policy for generating a plurality of first program recommendations by a virtual ride-hailing platform, a confounding policy for generating a plurality of second program recommendations based on the plurality of first program recommendations and a plurality of confounding variables, and a driver policy for generating a plurality of reactions of a plurality of virtual drivers based on the plurality of first program recommendations and the plurality of second program recommendations, and wherein the plurality of first program recommendations and the plurality of reactions form a plurality of simulated interactions between the plurality of virtual drivers and the virtual ride-hailing platform, and a data distribution of the plurality of simulated interactions approximates a data distribution of a plurality of interaction records in the plurality of historical interaction trajectories.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

FIG. 1A illustrates differences between Markov Decision Process (MDP) in a classic environment and an environment with a confounder in accordance with various embodiments.

FIG. 7 illustrates an exemplary method for constructing a virtual environment for a ride-hailing platform in accordance with various embodiments.

DETAILED DESCRIPTION

Figure 1B:
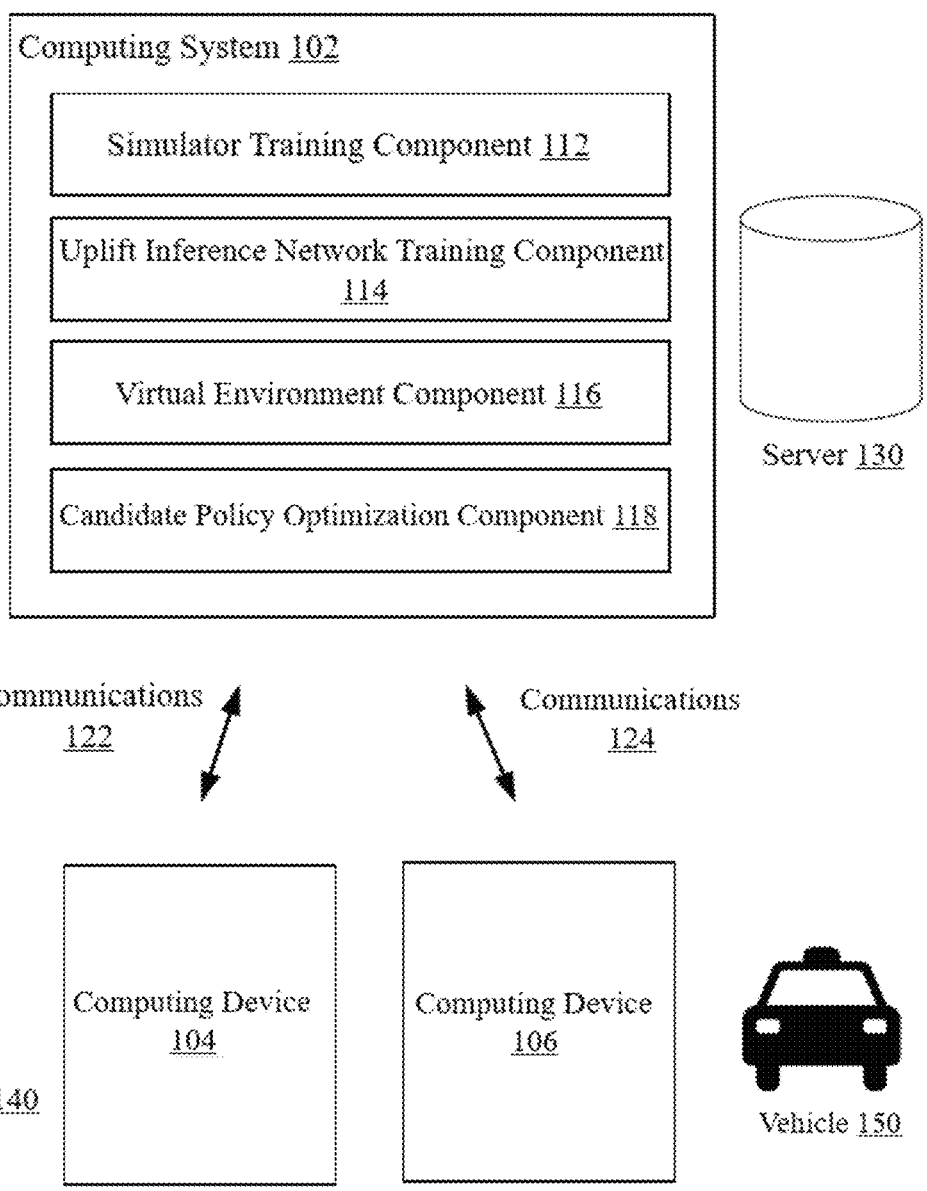
FIG. 1B illustrates an exemplary system to which optimizing recommendation policies may be applied in accordance with various embodiments.

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

The methods, systems, and storage mediums disclosed herein may be applied to various sequential recommendation problems, such as commodity recommendation, study material recommendation, incentives recommendation. The following description uses a ride-hailing platform recommending incentive programs to drivers as an example, but the approaches may be applied to other sequential recommendation scenarios with minor adjustments.

In some embodiments, the approaches disclosed herein may be adopted to design a method for applying reinforcement learning (RL) to optimize or train program recommendation policies in a virtual environment before the policies are actually deployed in a real-world environment. The virtual environment may refer to a simulated environment approximating the real-world environment, both of which include a plurality of drivers, a ride-hailing platform, and various environment parameters (also called confounding variables or confounding factors). The (virtual) drivers, the (virtual) ride-hailing platform, and the (virtual) various environment parameters interact in a similar way in the virtual environment as the ones interact in the real-world environment. In some embodiments, the virtual environment may be constructed as a simulator trained based on historical data to precisely recover the key dynamics of the real-world environment. The trained simulator may simulate interactions between virtual drivers and a virtual ride-hailing platform for a given program recommendation policy. In order to apply RL, an uplift inference network may be trained as a reward function for the virtual environment to quantify rewards for the simulated interactions. By combining the virtual environment with the uplift inference network, a program recommendation policy candidate may be trained or optimized to maximize the rewards without incurring interaction costs with the real-world environment.

Recommending programs by a ride-hailing platform to drivers using the platform may be classified as a sequential recommendation problem. The platform needs to make recommendations to drivers while taking into account the drivers' feedback. For example, the platform may recommend personalized programs (e.g., a certain amount of reward for finishing a certain number of orders within a period of time) to each driver, where each program is recommended according to how a previous program was received and responded by a corresponding driver. Thus, RL may be used to train a policy to make recommendations that maximize one or more desired rewards for the ride-hailing platform. In order to avoid the high trial-and-error cost of applying RL in the real-world environment (e.g., directly interact with drivers and the platform), the real-world environment may first be reconstructed as a virtual environment that approximates the real-world environment. In the following description, the driver in the virtual environment may refer to a virtual driver simulating a driver in the real-world (e.g., the way how the driver reacts to a recommended program), and the ride-hailing platform in the virtual environment may refer to a virtual ride-hailing platform that approximates the real-world ride-hailing platform (e.g., the way how the platform determines which program to recommend in observation of a driver's state).

The environment reconstruction may be accomplished by training an action policy for each virtual player (who can act in response to an observation) in the environment based on historical data. Take the example of the ride-hailing platform recommending programs to drivers, the drivers and the platform may be viewed as two agents interacting with each other, where the driver agent views the platform as the driver's environment, and the platform agent views the drivers as the platform's environment. Therefore, a platform policy and a driver policy may be trained from the historical data to simulate the interactions between the platform and the drivers. However, from the perspective of the drivers, they may receive much more information from the real-world that is not recorded in the historical data. These unobservable factors may be referred to as hidden confounders. Therefore, in order to accurately reconstruct a realistic environment in the real-world environment, these hidden confounders may be taken into account while training the policies in the virtual environment.

To facilitate describing application scenarios of various embodiments disclosed herein, several terms are first explained below.

Generative Adversarial Nets (GAN) may refer to an unsupervised machine learning technique that involves two neural networks, pitting one against the other (thus "adversarial") in order to generate new, synthetic instances of data that approximate the data distribution of real data. For example, GAN may train a generator G and a discriminator D in a two-player zero-sum game, wherein objective function is represented as:

$$\underset{G}{\arg\min}\,\underset{D \in (0,1)}{\arg\max} \mathbb{E}_{x \sim p_E}[\log D(x)] + \mathbb{E}_{z \sim p_Z}[\log(1 - D(G(z)))] \quad (1)$$

where G is the generator, D is the discriminator, PE is the expected (i.e., desired) distribution, and PZ is a noise distribution, x is a sample generated from the expected distribution, and z is a sample generated from the noise distribution. In this game, the generator G learns to produce samples x from the expected data distribution. The discriminator D is trained to classify the real samples and the generated samples by supervised learning, while the generator G aims to minimize the classification accuracy of D by generating samples like real ones. It may be noted that D may generate a value between 0 and 1 representing the similarity between the generated samples and the real ones. The discriminator D and the generator G are trained in an adversarial fashion until converge.

Generative Adversarial Imitation Learning (GAIL) allows a policy (e.g., an action policy learned in machine learning algorithms) to interact with the environment. It adopts the GAN framework to learn the policy (e.g., the generator G) with the guidance of a reward function (e.g., the discriminator D) given expert demonstrations as real samples. Using the same example as above, GAIL formulates an objective function represented as:

$$\underset{\pi}{\mathrm{argmin}}\,\underset{D\epsilon(0,1)}{\mathrm{argmax}}\mathbb{E}_\pi[\log D(s,a)]+\mathbb{E}_{\pi_E}[\log(1-D(s,a))]-\lambda H(\pi) \quad (2)$$

wherein π stands for the policy to be trained, D is the reward function, s refers to a state, a refers to an action, (s, a) represents a state-action pair, $\pi_E$ stands for the expert's join distribution over state-action pairs, λ is a multiplier, and $H(\pi) \triangleq \mathbb{E}\,\pi[-\log \pi(a|s)]$ represents the entropy of π.

With GAIL, the policy it may be optimized to maximize the similarity between the policy-generated trajectories and the expert ones measured by D. The "similarity" may be understood as a reward, or a negative loss. Thus, the updates to policy π are aimed to minimize a loss function represented as:

$$l(s,\pi(s))=\mathbb{E}_x[\log D(s,a)]-\lambda H(\pi)\approx \mathbb{E}_{\tau_i}[\log \pi(a|s)Q(s,a)]-\lambda H(\pi) \quad (3)$$

where $Q(s, a)=\mathbb{E}_{\tau_i}[\log(D(s, a))|s_0=s, a_0=a]$ is the state-action value function, π stands for the policy to be trained, D is the reward function (e.g., the discriminator), (s, a) represents a state-action pair, $\pi_E$ stands for the expert's join distribution over state-action pairs, λ is a multiplier, and H(π) represents the entropy of π. The discriminator D is trained to predict the conditional distribution D(s, a)=p(y|s, a), where y∈ [πE, π]. In other words, D(s, a) may be understood as the likelihood (e.g., probability) that the pair (s, a) comes from π rather than from πE.

Uplift Modeling may refer to a set of techniques that model the incremental impact of an action or a treatment on a user outcome. For example, a manager in an e-business company may be interested in estimating the effect of sending an advertising email to different customers on their probability to click the links to promotional ads. Uplift modeling is both a causal inference and a machine learning problem. It is a causal inference problem because it needs to estimate the difference between two outcomes that are mutually exclusive for an individual (either receives a promotional email or does not receive it). It is a machine learning problem as it needs to train different models and select the one that yields the most reliable uplift prediction according to some performance metrics.

The approaches disclosed herein may be adopted to design a pipeline for applying reinforcement learning (RL) to optimize or train program recommendation policies in a virtual environment before the policies are actually deployed in a real-world environment. In some embodiments, the virtual environment may be constructed as a simulator trained based on historical data to precisely recover the key dynamics of the real-world environment. The trained simulator may simulate interactions between drivers and a ride-hailing platform for a given program recommendation policy. In order to apply RL, an uplift inference network may be trained as a reward function for the virtual environment to quantify rewards for the simulated interactions. By combining the virtual environment with the uplift inference network, a program recommendation policy candidate may be trained or optimized to maximize the rewards without incurring interaction costs with the real-world environment.

FIG. 1A illustrates differences between Markov Decision Process (MDP) in a classic environment and an environment with a confounder in accordance with various embodiments. A Markov decision process (MDP) is a discrete time stochastic control process. It provides a mathematical framework for modeling decision making in situations where outcomes are partly random and partly under the control of a decision maker. RL is often adopted to solve MDP. As mentioned above, real-world scenarios often are too complex to offer a fully observable environment because of the presence of hidden confounders, such as weather, special events, holidays, other drivers' reactions, family members' location and schedule, government policies and regulations, competitors' policy changes, another suitable confounding factor, or any combination thereof. Ignoring these hidden confounders during RL may result in misunderstanding of the MDP and thus generate inaccurate policies. The embodiments disclosed herein learn a hidden confounding policy to take into account the impact of these confounders on the players (the drivers or the ride-hailing platform) in the real-world environment.

As shown in FIG. 1A, in the classic setting of section (a), the environment is assumed fully observable. That is, the policy may be learned solely based on the states observed from the environment. For example, the next state st+1 in a MDP depends on the previous state st and the executed action at in response to the previous state. However, in real-world applications, the next state st+1 may be further influenced by some hidden confounders. As shown in section (b) of FIG. 1A, a confounding variable h (also denoted as a confounder) may be present in the environment and not observable. In RL, hidden confounders may affect both actions and rewards as an agent interacts with the environment. For example, the previous state st and the hidden confounding variable h may be jointly deemed as an observation ot, which may directly affect the policy in determining the action at. In response to the action at, the environment may transition into the new state st+1, which may be similarly affected by the confounding variable h and jointly provide an observation Ot+1. As a result, ignoring the confounders during the learning process might mislead the RL agents (e.g., policies) by the appeared fake associations in the data, due to the unawareness of the possible hidden causes. Thus, it is important to involve the confounder into the learning task.

FIG. 1B illustrates an exemplary system 100 to which optimizing recommendation policies may be applied, in accordance with various embodiments. The exemplary system 100 may include a computing system 102, a computing device 104, and a computing device 106. It is to be understood that although two computing devices are shown in FIG. 1B, any number of computing devices may be included in the system 100. Computing system 102 may be implemented in one or more networks (e.g., enterprise networks), one or more endpoints, one or more servers, or one or more clouds. A server may include hardware or software which manages access to a centralized resource or service in a network. A cloud may include a cluster of servers and other devices which are distributed across a network.

The computing devices 104 and 106 may be implemented on or as various devices such as a mobile phone, tablet, server, desktop computer, laptop computer, vehicle (e.g., car, truck, boat, train, autonomous vehicle, electric scooter, electric bike), etc. The computing system 102 may communicate with the computing devices 104 and 106, and other computing devices. Computing devices 104 and 106 may communicate with each other through computing system 102, and may communicate with each other directly. Communication between devices may occur over the internet, through a local network (e.g., LAN), or through direct communication (e.g., BLUETOOTH™, radio frequency, infrared).

In some embodiments, the system 100 may include a ride-hailing platform. The ride-hailing platform may facilitate transportation service by connecting drivers of vehicles with passengers. The platform may accept requests for transportation from passengers, identify idle vehicles to fulfill the requests, arrange for pick-ups, and process transactions. For example, passenger 140 may use the computing device 104 to order a trip. The trip order may be included in communications 122. The computing device 104 may be installed with a software application, a web application, an API, or another suitable interface associated with the ride-hailing platform.

The computing system 102 may recommend various programs to the passengers and the drivers of the vehicles 150 through communications 122 and 124, respectively. These programs may be designed for various purposes. For example, promotion programs (e.g., coupons, discounts) may be sent to the passengers 140 to encourage their use of the ride-hailing service. Driver incentive programs (e.g., bonus for finishing a certain number of rides within a period and/or within a location) may be recommended to the drivers of vehicles 150 to increase the activities on the platform, or driver supply in certain areas. These passenger promotion programs may be sent to the passengers 140 through the computing devices 104 associated with the passengers 140, such as smart phones. Similarly, the driver incentive programs may be delivered to the computing devices 106 associated with the drivers of the vehicles 150. After programs are recommended to the passengers 140 and the drivers of the vehicles 150, the computing system 102 may monitor or collect their reactions in order to determine whether the recommended programs are effective in achieving the desired business purposes. The drivers' reactions may include acting in accordance with the recommended programs (such as repositioning to a target location specified in a recommended program) or acting by ignoring the recommended programs (such as staying idle without serving orders). Based on the monitored or collected reactions, the computing system 102 may determine and adjust its strategy in recommending the next program. The recommended programs (from the ride-hailing platform) and reactions (of the drivers in response to the recommended programs) of this iterative process may be collected and stored in a server 130 as historical data. The historical data may be mined to help the ride-hailing platform discover the underlying relationships between its program recommendation policies and user (drivers and/or passengers) reactions, and optimize the policies accordingly.

While the computing system 102 is shown in FIG. 1B as a single entity, this is merely for ease of reference and is not meant to be limiting. One or more components or one or more functionalities of the computing system 102 described herein may be implemented in a single computing device or multiple computing devices. The computing system 102 may include a simulator training component 112, an uplift inference network training component 114, a virtual environment component 116, and a candidate policy optimization component 118.

In some embodiments, the simulator training component 112 may be configured to train a simulator by reconstructing the ride-hailing environment. In some embodiments, two representative agents (platform agent $\pi_a$ and driver agent $\pi_b$) may first be formulated to interact with each other to learn a platform policy and a driver policy. The platform policy may reflect a mapping relationship between an observation (e.g., a driver's state) and a program to be recommended (e.g., an incentive program to be recommended to the driver). The driver policy may reflect a mapping relationship between a recommended program received by a driver and the driver's reaction to the recommended program. In addition, in order to simulate the confounding effect of hidden confounders, a new agent $\pi_h$ may then be added into the interaction to learn a hidden confounding policy to reflect the impact of the hidden confounders on the driver policy. According to the causal relationship, each of the three policies corresponding to $\pi_a$, πb, and $\pi_h$ may be trained based on interaction data between the drivers and the platform by imitation learning. Since the hidden confounders are unobservable from the training data, the policy for $\pi_h$ (denoted as confounding policy) may not be directly learned. In some embodiments, a confounder embedded policy and a compatible discriminator may be used to train the simulator. The confounder embedded policy may embed the confounding policy into one of the observable policies corresponding to $\pi_a$ and $\pi_b$. The compatible discriminator is designed to discriminate the state-action pairs of the two observable policies (e.g., one observed policy, and one joint policy comprising the other observed policy and the confounding policy) so as to provide the respective imitation reward. As the training converges, the de-confounded environment may be reconstructed as a simulator.

In some embodiments, the uplift inference network training component 114 may be configured to train a neural network to infer the uplift of a platform action for a given observation. Uplift is a measure of the incremental impact of an action to the platform, and it may be used to measure that efficiency of the action. After the simulator is trained by the simulator training component 112, a platform policy candidate (e.g., a manual configured policy, a randomly generated policy, or a to-be-optimized policy) may be trained with RL by interacting with the environment provided by the simulator. In one embodiment, in this simulator-based RL, the platform actions are determined to maximize a long-term cumulative reward. However, in many real-world applications, the execution of an action may consume certain resources (e.g., a budget for the total amount of incentives within a period of time). When the amount of resources is limited, the choice of an action cannot only focus on the reward. For example, an action with the largest long-term value may not be the optimal one if it would inevitably cause more resource consumption. For this reason, the resource utilization efficiency of each action may need to be considered while determining which action to take. In some embodiments, a deep neural network is adopted for uplift modeling to infer the uplift in a multi-treatment setting, where each treatment may correspond to an action. The network structure may be divided into two modules from functional perspective: representation module and inference module. The representation module may be designed to learn effective representations of the counter-factual space (e.g., an observation in the environment). Following the representation module, the inference module may split into two branches: the control branch and the treatment branch. The control branch may be trained to predict the potential outcome of a control action (e.g., without treatment). Based on the output of the control branch, the treatment branch is trained to infer the uplift behind the observed outcome by executing a treatment. The network may be trained in an alternate optimization approach, by inferring uplift by alternately updating the parameters of two branches. When the model converges, the output of the treatment branch may converge to the true value of uplift.

In some embodiments, the virtual environment component 116 may be configured to construct a virtual training environment for optimizing platform policy candidates. The simulator constructed by the simulator training component 112 may generate simulated interactions between drivers and the ride-hailing platform in response to the policy candidates, and the uplift inference network trained by the uplift inference network training component 114 may be used as a reward function to evaluate the simulated interactions and thus guide the optimization of the policy candidates.

In some embodiments, the candidate policy optimization component 118 may be configured to optimize policy candidates using the virtual environment constructed by the virtual environment component 116. The virtual environment may provide a simulator to simulate a driver's response to a platform's action, where the platform's action is determined according to a platform policy candidate, and then simulate the platform's reaction to the driver's response. At the same time, the uplift inference network trained by the uplift inference network training component 114 may determine a reward for each action determined by the platform policy, and thus provide guidance to optimize the platform policy candidate. In some embodiments, the optimization may be performed for a certain number of iterations or a certain period of time, and the resultant policy may be deemed as an optimized version of the policy. The platform may determine whether to deploy such optimized policy accordingly.

Figure 2:
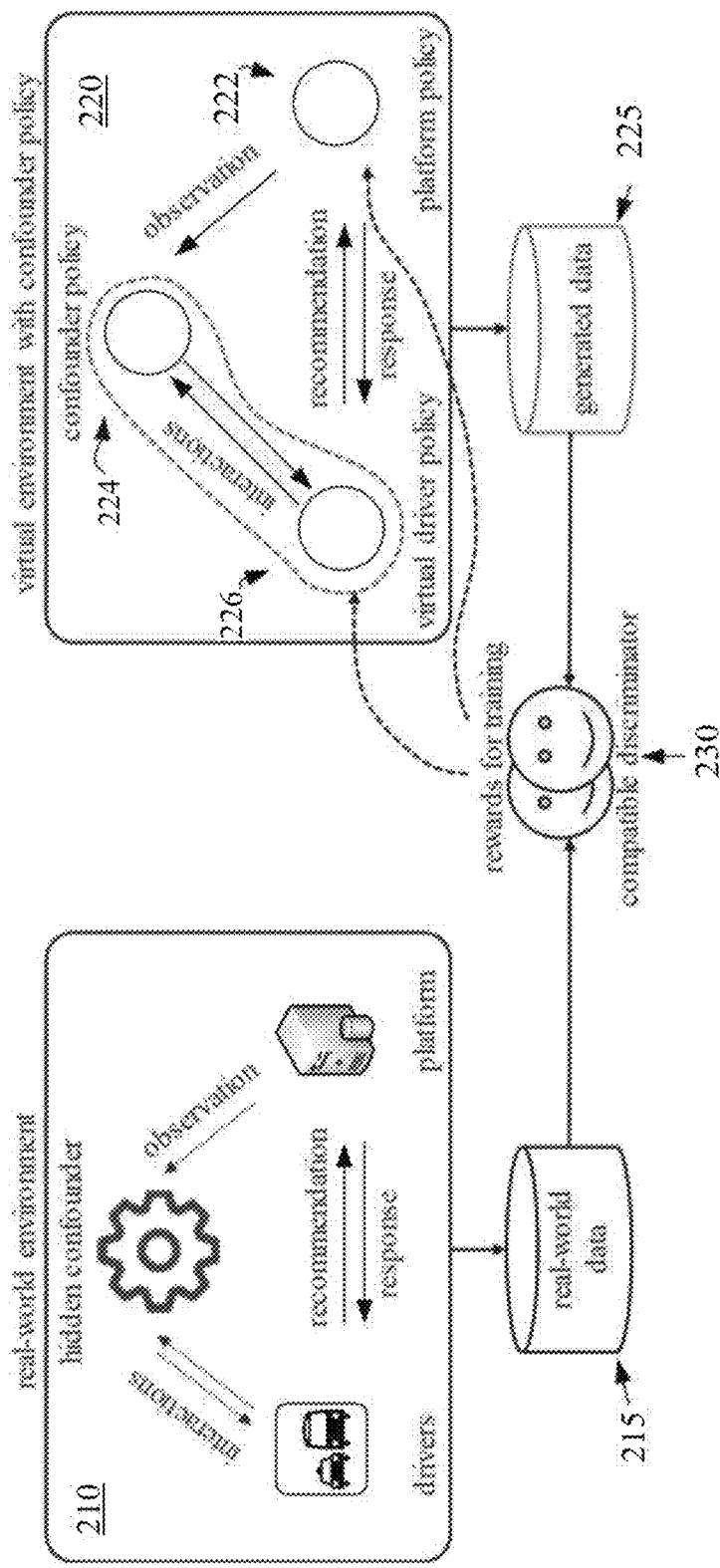
FIG. 2 illustrates an exemplary construction of a virtual environment for driver program recommendation in accordance with various embodiments.

FIG. 2 illustrates an exemplary construction of a virtual environment for driver program recommendation in accordance with various embodiments. The real-world environment 210 in FIG. 2 involves a plurality of drivers and a ride-hailing platform directly interacting with each other. In the real-world environment 210, the platform may have various incentive programs to encourage drivers to perform certain actions. For example, after a driver is notified that a certain region has a higher surge multiplier (which may result in higher driver fare), he or she may be incentivized to move towards that region to serve. By this way, the supply-demand balance in that region may be adjusted. During this process, the platform may determine which incentive program to recommend to a specific driver. The factors considered by the platform may include the driver's information. In response to the programs recommended by the platform, the drivers may react in certain ways. The drivers' reactions may transition the drivers' states into new states.

Besides the two observable players (e.g., the drivers and the platform), the real-world environment 210 may further comprise various hidden confounders that have impact on the drivers' reactions to the policy recommendations. Some examples of the confounding factors may include weather, special events, holidays, other drivers' reactions, government policies and regulations, competitors' policy changes, another suitable confounding factor, or any combination thereof. These confounding factors may not be directly recorded in the real-world historical data 215, but they may have an underlying impact on the drivers' reactions. For example, bad weather may discourage a driver from performing according to a recommended program; a competitor's new incentive policy may distract the driver (e.g., by providing more attractive incentives) and thus diminish the effect of the recommended program. As another example, one driver's reaction to a recommended program may affect another driver's decision. Therefore, the drivers' reaction collectively may also affect the impact of the hidden confounders. In other words, the drivers and the hidden confounders interact with each other in an unobservable way. However, the underlying impact of these confounding factors on the drivers may be learned and recovered from the drivers' resultant performance and actual reaction to the recommended programs. In some embodiments, the underlying impact may be recovered as a hidden policy in the virtual environment 220 corresponding to the real-world environment 210.

In some embodiments, the virtual environment 220 corresponding to the real-world environment 210 may include a simulated platform policy 222, a confounder policy 224, and a simulated driver policy 226. These policies may be trained based on the real-world data 215 and collectively generate simulated data 225. The virtual environment 220 is constructed in a way that the data distribution of the generated data 225 approximates the data distribution of the real-world data 215. In some embodiments, the distance between the two data distributions may be measured by various divergences, such as a Kullback-Leibler (KL) divergence, Bregman divergence, Hellinger distance, or another suitable divergence measurement. Here, "approximate" may refer to an action to minimize a divergence between the two data distributions. In some embodiments, a discriminator 230 may be designed to determine a likelihood that the data generated by the virtual environment is from the real-world data 215. A high likelihood may indicate a high quality simulation and thus a higher reward for training the policies. That is, the discriminator 230 may serve as a reward function for training the policies in the virtual environment 220.

Within the virtual environment 220, the platform policy 222 is trained to generate a simulated action of the ride-hailing platform for a driver. The factors considered by the platform policy 222 may include the driver's features, such as static features (e.g., age, gender, vehicle information, another feature that does not change regularly) and dynamic features (e.g., recent activities, customer rating, current temporal and/or spatial information). In response to a recommendation from the platform policy 222, the simulated driver policy 226 may react in a certain way. As explained above, a driver's reaction may not solely be affected by the recommendation, but also impacted by certain hidden confounders. The underlying impacts of the confounders may be trained as a confounder policy 224. Whenever a confounder is implied (e.g., current weather, competitor's new policy), it may be captured by the confounder policy 224, and impact the simulated driver policy 226. By this way, a driver's reaction simulated by the virtual environment 220 may take into account the hidden confounders in the real-world environment 210.

Figure 3:
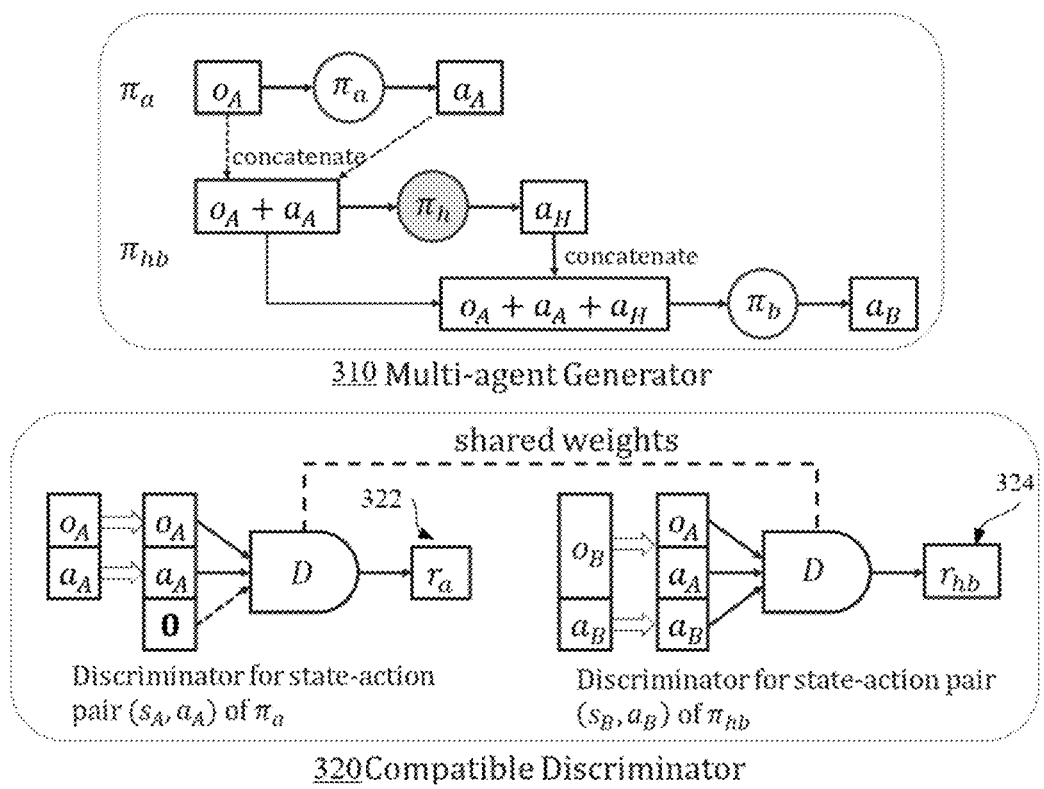
FIG. 3 illustrates an exemplary training process of a simulator for driver program recommendation in accordance with various embodiments.

FIG. 3 illustrates an exemplary training process of a simulator for driver program recommendation in accordance with various embodiments. The simulator may refer to the virtual environment 220 in FIG. 2. As shown, the training of the simulator may involve a multi-agent generator 310 and a compatible discriminator 320. The multi-agent generator 310 comprises a first agent learning a platform policy $\pi_a$, a second agent learning a hidden confounding policy $\pi_h$, and a third agent learning a driver policy $\pi_b$. The compatible discriminator 320 may refer to the discriminator 230 in FIG. 2, and may provide a compatible interface for evaluating both simulated platform actions and simulated driver actions generated by the multi-agent generator 310.

In some embodiments, the multi-agent generator 310 may be learned by imitation learning. The objective function may be defined as:

$$(\pi_a, \pi_b, \pi_h) = \underset{(\pi_a, \pi_b, \pi_h)}{\operatorname{argmin}} \mathbb{E}_{o_A \sim P_{\tau_{real}}}[L(o_A, a_A, a_B)] \qquad (4)$$

where E refers to expectation, $\pi_a$ refers to the platform policy, $\pi_h$ refers to the hidden confounding policy, and $\pi_b$ refers to the driver policy, L refers to an imitation loss function, $O_A$ refers to an observation obtained from real historical data, $P_{\tau_{real}}$ refers to a data distribution of the real historical data, $a_A$ may refer to a simulated action of the platform according to the platform policy $\pi_a$, and $a_B$ may refer to a simulated action of the driver according to the driver policy $\pi_b$. That is the training of the three policies aims to minimize a loss function so that the simulated actions generated by the simulator is as close to the real data distribution as possible.

According to formula (3), the imitation loss function L in formula (4) may be represented as:

$$L(o_A, \pi_a, \pi_h, \pi_b) = \mathbb{E}_{\pi_a, \pi_h, \pi_b}[\log D(o_A, a_A, a_B)] - \lambda \sum_{\pi \in \{\pi_a, \pi_h, \pi_b\}} H(\pi) \qquad (5)$$

where $H(\pi)$ represents the entropy of $\pi$, $\lambda$ is a multiplier, and D is the discriminator (reward function).

In some embodiments, the platform policy $\pi_a$ may be independent with the hidden confounding policy $\pi_h$ and the driver policy $\pi_b$. With conditional independence, the $D(O_A, a_A, a_B)$ may be decomposed as $$\begin{aligned}
D(o_A, a_A, a_B) &= p(\pi_a, \pi_h, \pi_b \mid o_A, a_A, a_B) \qquad (6) \\
&= p(\pi_a \mid o_A, a_A, a_B) p(\pi_h, \pi_b \mid o_A, a_A, a_B) \\
&= p(\pi_a \mid o_A, a_A) p(\pi_h, \pi_b \mid o_A, a_A, a_B) \\
&= D_a(o_A, a_A) D_{hb}(o_A, a_A, a_B)
\end{aligned}$$

where $D_a(O_A, a_A)$ refers to the imitation item of policy $\pi_a$, and $D_{hb}(O_A, a_A, a_B)$ refers to the imitation item of policies $\pi_h$ and $\pi_b$. Combining formula (5) and (6), the loss function may be decomposed as:

$$\begin{aligned}
L(o_A, \pi_a, \pi_h, \pi_b) &= \mathbb{E}_{\pi_a, \pi_h, \pi_b}[\log Da(o_A, a_A) D_{hb}(o_A, a_A, a_B)] - \lambda \sum_{\pi \in \{\pi_a, \pi_h, \pi_b\}} H(\pi) \qquad (7) \\
&= \mathbb{E}_{\pi_a}[\log Da(o_A, a_A)] - \lambda H(\pi_a) + \\
&\quad \mathbb{E}_{\pi_h, \pi_b}D_{hb}(o_A, a_A, a_B)\Big] - \lambda \sum_{\pi \in \{\pi_h, \pi_b\}} H(\pi) \\
&= L(o_A, \pi_a(o_A)) + l((o_A, a_A), \pi_b O \pi_h((o_A, a_A)))
\end{aligned}$$

which indicates that the optimization of the three policies may be decomposed as optimizing policy $\pi_a$ and joint policy $\pi_{hb}$ (comprising both $\pi_h$ and $\pi_b$) individually by minimizing their respective loss functions. The loss function for the platform policy $\pi_a$ may be represented as:

$$\begin{aligned}
l(o_A, \pi_a(o_A)) &= \mathbb{E}_{\pi a}[\log D_a(o_A, a_A)] - \lambda H(\pi_a) \qquad (8) \\
&\cong \mathbb{E}_{\tau_i}[\log \pi_a(a_A \mid o_A) Q(o_A, a_A) - \lambda H(\pi_a)
\end{aligned}$$

where $Q(o_A, a_A) = \mathbb{E}_{\tau_i}[\log(D(o_A, a_A))|o_0 = o_A, a_0 = a_A]$ refers to a state-action value function of $\pi_a$, and the loss function of the joint policy $\pi_{hb}$ may be represented as:

$$\begin{aligned}
l((o_A, a_A), \pi_{hb}((o_A, a_A))) &= \qquad (9)\\
\mathbb{E}_{\pi h, \pi b}[\log D_{hb}((o_A, a_A), a_B)] &- \lambda \sum_{\pi \in \{\pi_h, \pi_b\}} H(\pi) \cong \\
\mathbb{E}_{\tau_i}[\log \pi_{hb}(a_B \mid o_A, a_A) Q(o_A, a_A, a_B)] &- \lambda \sum_{\pi \in \{\pi_h, \pi_b\}} H(\pi)
\end{aligned}$$

where $Q(o_A, a_A, a_B) = \mathbb{E}_{\tau_i}[\log(D(o_A, a_A), a_B))|o_0 = o_A, a_{A0} = a_A, a_{B0} = a_B]$ refers to a state-action value function of $\pi_{hb}$.

As described above, the interaction between the agent A (platform policy agent) and the agent B (driver policy agent) may be observed, while the policy and data of the agent H (known as hidden confounders) are unobservable. In some embodiments, based on the decomposition result of the objective function in formula (4), the confounder policy $\pi_h$ with the observable policy $\pi_b$ may be jointly trained, denoted as $\pi_{hb}$. Together with the observable policy $\pi_a$, the multi-agent generator may be formalized as an interactive environment of two policies. In some embodiments, the joint policy $\pi_{hb}$ may be represented as:

$$\pi_{hb}(o_A, a_A) = \pi_b(o_A, a_A, \pi_h(o_A, a_A)) \qquad (10)$$

where the input $(O_A, a_A)$ and the output $a_B$ are both observable from the historical data. Therefore, these two policies $\pi_b$ and $\pi_{hb}$ may be trained with imitation learning methods to imitate the observed interactions.

Referring back to FIG. 3, the policies $\pi_a$, $\pi_b$, $\pi_{hb}$ in the multi-agent generator 310 collectively determine the simulated actions for the platform and the drivers. In the example shown in FIG. 3, $O_A$ may refer to an observation of a driver (e.g., the driver's static and dynamic features), which may be input into the platform policy $\pi_a$ to generate a simulated platform action $a_A$. The observation $O_A$ and the simulated platform action $a_A$ may then be concatenated as an input to the hidden confounding policy $\pi_h$, which may generate an intermediate action $a_H$. The $a_H$ may be in the same format as $a_A$ but with adjustments caused by various confounding factors. Subsequently, the observation $O_A$, the simulated platform action $a_A$, and the intermediate action $a_H$ may be concatenated as an input to the driver policy $\pi_b$ to generate a simulated action of the driver $a_B$. With the involvement of the hidden confounding policy $\pi_h$, the impact of the confounding factors is considered when determining the driver's action in response to the platform's action, e.g., a recommended incentive program.

In some embodiments, the compatible discriminator 320 shown in FIG. 3 is trained as a reward provider for the multi-agent generator 310. Different from general adversarial learning frameworks where only one task needs to be modeled and learned in the generator, here, at least two different reward functions need to be developed for the platform policy $\pi_a$ and the joint confounder-driver policy $\pi_{hb}$ in the multi-agent generator, respectively. In some embodiments, the discriminator 320 is designed to be compatible with both policies and serve a unified interface to provide both reward functions. Correspondingly, the discriminator 320 may have two types of input: state-action pairs $(O_A, a_A, a_B)$ of policy $\pi_{hb}$, and zero-padded state-action pairs $(O_A, a_A, 0)$ of policy $\pi_a$. This setting indicates that the discriminator 320 splits not only the state-action space of the policy $\pi_{hb}$, but also the state-action space of the policy $\pi_a$. Formally, the loss functions may be defined as $$E_{\tau sim}[\log(D_\sigma(o_A,a_A,a_B))]+E_{\tau real}[\log(1-D_\sigma(o_A,a_A,a_B))] \quad (11)$$

for policy $\pi_{hb}$, and $$E_{\tau sim}[\log(D_\sigma(o_A,a_A,0))]+E_{\tau real}[\log(1-D_\sigma(o_A,a_A,0))] \quad (12)$$

for policy $\pi_a$, where $\Gamma_{sim}$ refers to a data distribution of the simulated state-action pairs, $\Gamma_{real}$ refers to a data distribution of the real (observed) state-action pairs, ϭ represents the parameters of the discriminator. The output of the discriminator 320 may be a probability that an input state-action pair comes from the data distribution observed in the real environment. The discriminator 320 may be trained with supervised learning by labeling the real state-action pair as 1 and the simulated fake state-action pair as 0. Accordingly, the reward function for policy $\pi_{hb}$ may be represented as:

$$r_{HB}=-\log(1-D(o_A,a_A,a_B)) \quad (13)$$

and the reward function for policy $\pi_a$ may be represented as:

$$r_A=-\log(1-D(o_A,a_A,0)) \quad (14)$$

For example, the compatible discriminator 320 may provide one interface accepting three inputs: an input observation, a first input action, and a second input action. For the case of $\pi_a$, the observation $O_A$ and the simulated platform action $a_A$ may be inputted to the compatible discriminator 320 as the input observation and the first input action, and the second input action may be padded with a zero. Correspondingly, the compatible discriminator 320 may generate a reward $r_a$ 322 according to formula (13) for the input state-action pair $(S_A, a_A)$, where $S_A=O_A$. For the case of $\pi_{hb}$, the observation $O_A$ and the simulated platform action $a_A$ (may be collectively denoted as observation B, or $O_B$) may be inputted to the compatible discriminator 320 as the input observation and the first input action, and the simulated action of the driver $a_B$ may be input to the compatible discriminator 320 as the second input action. Correspondingly, the compatible discriminator 320 may generate a reward $r_{hb}$ 324 according to formula (14) for the input state-action pair $(S_B, a_B)$, where $S_B=\{O_A, a_A\}$. This way, one compatible discriminator 320 is trained to serve as two reward functions (sharing weights) respectively for the platform policy $\pi_a$ and the joint confounder-driver policy $\pi_{hb}$.

Figure 4:
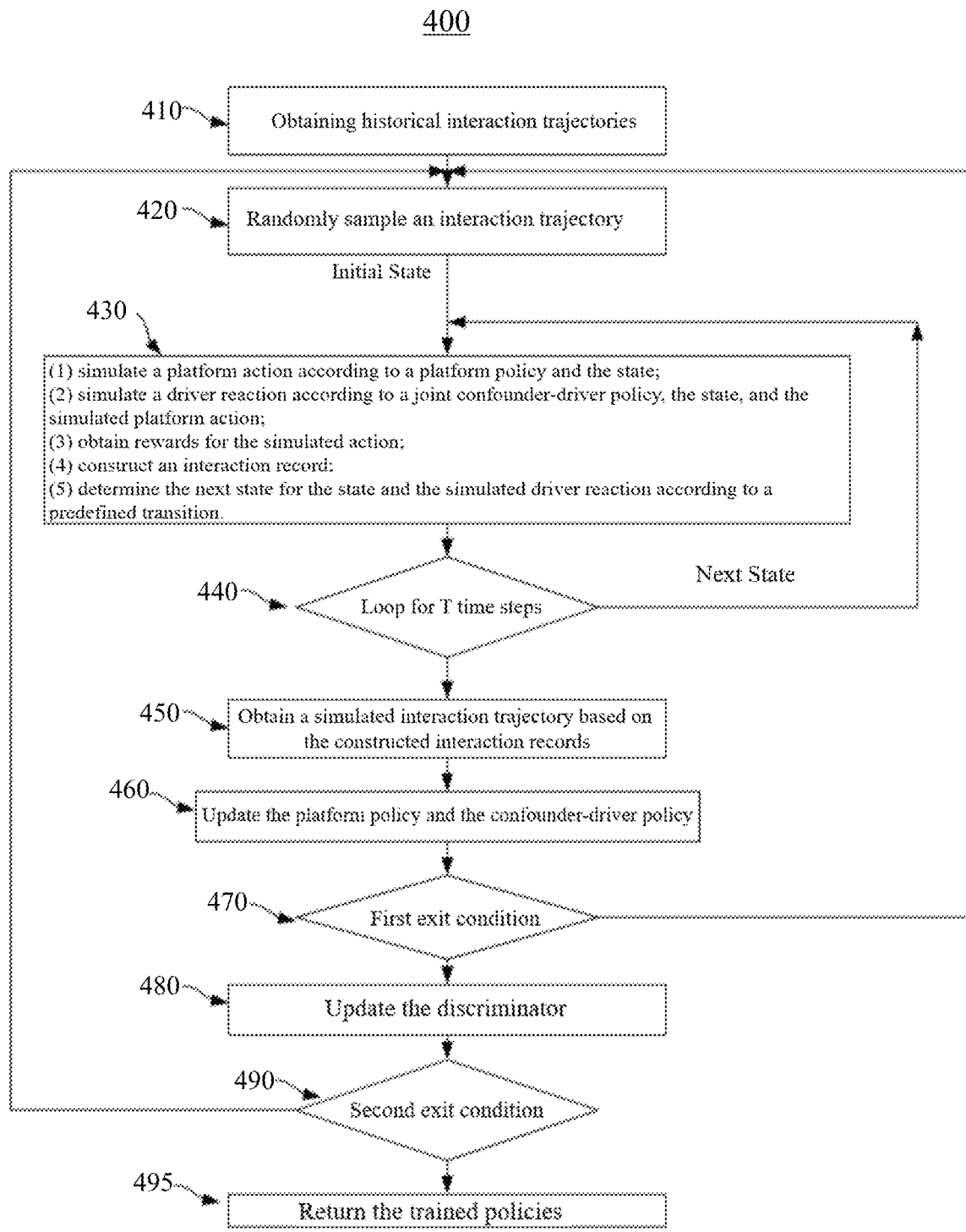
FIG. 4 illustrates an exemplary method for training a simulator for driver program recommendation in accordance with various embodiments.

FIG. 4 illustrates an exemplary method 400 for training a simulator for driver program recommendation in accordance with various embodiments. The method 400 may be adopted to train the multi-agent generator and the compatible discriminator illustrated in FIG. 3. The method 400 may be implemented by the computing system 102 in FIG. 1. Depending on the implementation, the method 400 may have more, fewer, alternative steps. In some embodiments, the steps (including sub-steps within each step) illustrated in FIG. 4 may be executed in different order, sequentially or in parallel.

In some embodiments, the method 400 may start with initializing the parameters of a platform policy, a driver policy, a hidden confounding policy, and a discriminator. The process of the training of the simulator may involve adjusting the parameters of the policies and the discriminator to maximize cumulative rewards.

In step 410, a plurality of historical interaction trajectories may be obtained from historical data, each of the plurality of historical interaction trajectories comprising a sequence of observed interaction records between a driver and a ride-hailing platform, each interaction record comprising a recommendation from the ride-hailing platform and the driver's response to the recommendation. The trajectory may span a plurality of points in time. For example, in the context of recommending programs to drivers, the action at each point in time may include recommending (by the ride-hailing platform) a program to a driver according to the driver's state, and the state at each point in time may refer to the driver's state, including dynamic information related to the point in time, such as recent activities up to the point in time, information of the domain (e.g., features and dynamics) that the driver is in, spatial and temporal information, other suitable information, or any combination thereof. In some embodiments, the state may also include the driver's static information such as personal information, the driver's vehicle information, the driver's tenure on the ride-hailing platform. In some embodiments, the state of the driver at each point in time may or may not depend on the action at a previous point in time. For example, if the driver receives a recommended program (i.e., the action by the ride-hailing platform at a previous point in time) and reacts (e.g., stay, relocate, accept an order, etc.) according to the recommended program and the environment, he or she may change its previous state to a new state. In this case, the new state at the current point in time is dependent on the action at the previous point in time and some environmental parameters. As another example, if the driver ignores a recommended program, his or her next state may be independent of the action at the previous point in time, and only affected by the environmental parameters. These environmental parameters may include weather, special events, holidays, family members' locations and schedules, competitor's policies, and so on. For example, the driver may reposition to a target region not only because he or she prefers to execute the recommended program therein, but also because it is more convenient to pick up a family member at the target region. Thus, the driver's new state is not only affected by the action of the platform, but also the environment parameters.

In step 420, one of the interaction trajectories may be randomly sampled from the plurality of obtained historical interaction trajectories. The first interaction record in the interaction trajectory may include an initial state of the corresponding driver. The initial state may be inputted into the simulator to generate a simulated interaction trajectory according to the policies in the simulator.

In step 430, upon receiving the input state, the platform policy may simulate a platform action. The joint confounder-driver policy may simulate a driver action (e.g., a simulated reaction to the simulated platform action) by considering the input state, the simulated platform action, and the impacts of various confounding factors. Then the discriminator may determine a first reward for the simulated platform action, and a second reward for the simulated driver action. Subsequently, a simulated interaction record may be constructed by including the input state, the simulated action of the platform, the simulated action of the driver, and the first and second rewards. Lastly, the input state may be transitioned to a new state based on the simulated driver's action and predefined transition rules.

In step 440, a loop may be created to repeat the step 430 for a plurality of iterations. In some embodiments, the number of iterations (denoted as T) may be equal to the number of interaction records in the sampled interaction trajectory from the historical data. This is to make sure the simulated trajectory and the sampled interaction trajectory (from the real world)) have the same length. For each iteration, the new state may be fed into the step 430 as the new input state. In other embodiments, the number of iterations may be greater or smaller than the number of interaction records. In some embodiments, the loop in step 440 may exit before iterating for T times when certain conditions are met, e.g., when a timer expires.

In step 450, the simulated interaction trajectory may be constructed based on the sequence of interaction records generated from step 430 during the loop.

In step 460, the parameters of the platform policy and the joint confounder-driver policy may be updated according to the interaction trajectory. For example, based on the rewards for each interaction record in the trajectory, Trust Region Policy Optimization (TRPO) may be used to optimize the parameters of the policies.

In step 470, steps 420-460 may be repeated to sample more interaction trajectories and further update the parameters of the platform policy and the joint confounder-driver policy until a first exit condition is met. In some embodiments, the first exit condition may be determined based on the number of steps of generator per discriminator step (e.g., updating the discriminator once after the generator is updated for a plurality of times). In other embodiments, the first exit condition may comprise a timer (e.g., the repetition terminates when the time expires), a convergency monitor (e.g., the repetition terminates when the parameters of the generator are converged), another suitable exit condition, or any combination thereof.

In step 480, the parameters of the discriminator may be updated by minimizing the losses in formulas (11) and (12).

In step 490, the training process in steps 420-460 may be repeated until a second exit condition is met. In some embodiments, the second exit condition may comprise a counter (e.g., the repetition terminates when the counter expires), a timer (e.g., the repetition terminates when the timer expires), a convergence monitor (e.g., the repetition terminates when the parameters of the generator and/or the discriminator are converged), another suitable exit condition, or any combination thereof.

In step 495, the trained policies $\pi_a$, $\pi_h$, and $\pi_b$ are returned. These trained policies may be formed as the trained simulator to simulate the interactions between the drivers and the platform.

Figure 5:
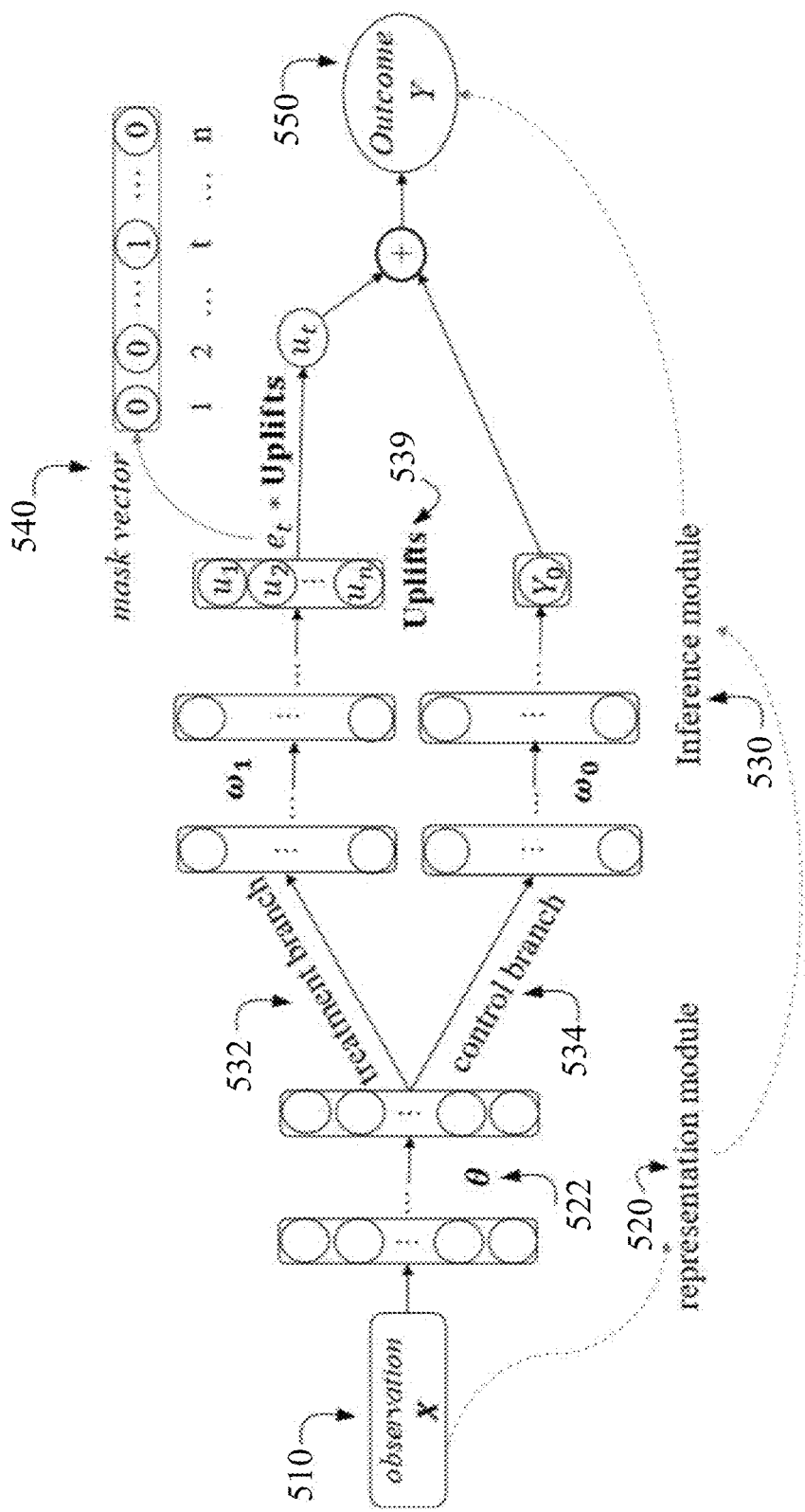
FIG. 5 illustrates an exemplary diagram of an uplift inference network for driver program recommendation in accordance with various embodiments.

FIG. 5 illustrates an exemplary diagram of an uplift inference network for driver program recommendation in accordance with various embodiments. As described above, the uplift inference network may be trained to evaluate the actual reward by performing an action when performing the action itself consumes certain resources. Uplift may serve as a better reward function when the resources are limited. A reward function in the context of machine learning (including RL) provides guidance on how the model (e.g., a policy) being trained needs to be optimized. For example, recommending a program by the ride-hailing platform to a driver may yield certain rewards to the platform (e.g., the driver may finish a greater number of orders), but the rewards may not be solely caused by the recommended program. It is possible that, even if the program is not recommended, the platform still observes some reward. As another example, each program recommended by the ride-hailing platform may consume an uncertain amount of resources, and thus the resource consumption cost needs to be considered during making each recommendation. As a result, it is critical to understand the uplift (also called incremental reward) between recommending the program and not recommending the program. However, a historical interaction trajectory may only disclose the reward of one of the two options (either the program is recommended, or not recommended). Thus, the uplift inference network needs to be trained to predict the incremental reward of recommending each program.

In some embodiments, the uplift inference network may comprise two modules: a representation module 520, and an inference module 530. The representation module 520 may be trained to learn high-level features of input observed data (e.g., an observed driver's state) that can effectively represent the potential outcome space. Based on the high-level features, the inference module 530 may be trained to predict the outcome 550 that is given in the observed data. In some embodiments, the inference module 530 may be split into two branches: the control branch 532 and the treatment branch 534. The output of the control branch 532 comprises the estimated reward if no treatment is performed, and the output of treatment branch 534 is the uplift estimation for a specific treatment (e.g., the incremental reward).

The representation module 520 may have a plurality of parameters $\theta$ 522 to be trained, the treatment branch 532 may have a plurality of parameters $\omega 1$ to be trained, and the control branch 534 may have a plurality of parameters $\omega 0$ to be trained. The input to the uplift inference network may comprise an observation 510. Here, the observation 510 may refer to a driver's information, including static information and dynamic information. The representation module 520 may then extract high level features from the input observation 510, and feed the extracted features into the treatment branch 523 and control branch 534.

In the control branch 534, the extracted features are fed through one or more layers of neurons with parameters $\omega 0$ to generate an estimated reward $Y_0$ for not recommending a program to the driver.

In the treatment branch 532, the extracted features are fed through one or more layers of neurons with parameters $\omega 1$ to generate a plurality of uplifts 539 for a plurality of program candidates to be recommended to the drivers. When the uplift inference network needs to obtain an uplift for recommending a specific program to a driver under a certain condition, a mask vector 540 may be provided to the treatment branch 532 of the uplift inference network. The mask vector 540 comprises a plurality of binary values indicating which program is activated (e.g., queried). If the mask vector 540 has a value 1 at its position t, the uplift of program t may be extracted from the uplifts 539, denoted as $u_t$. Based on the $u_t$ and the $Y_0$, a final outcome Y may be determined, where Y may represent the observed gain by recommending program t to the driver.

In some embodiments, the uplift inference network may be trained with a supervised alternate optimization approach. The control branch 534 of the uplift inference network and the representation module 520 may be jointly trained; and the treatment branch 532 of the uplift inference network and the representation module 520 may be jointly trained. Accordingly, the objective function of the training process may be formulated as:

$$l(x,t,\hat{y},\theta,\omega_0,\omega_1)=L(\hat{y},y_0(x,\theta,\omega_0)+e_t*u_n(x,\theta,\omega_1)) \quad (15)$$

where $\theta$, $\omega_0$, $\omega_1$ are the parameters for the representation module 520, the treatment branch 532, and the control branch 534, respectively, x refers to the observation 510 (input state), t refers to time or other suitable temporal information, $\hat{y}$ refers to the ground truth outcome, $y_0$ refers to the predicted outcome 550 (the outcome from the control branch and the uplift from the treatment branch) under the observation x and treatment t, $e_t$ refers to the mask vector 540 with the t-th bit set as 1, $u_n$ refers to the uplifts 539, L refers to a loss function that may be a regression loss function (e.g., Mean Squared Error (MSE) or Root Mean Squared Error (RMSE)), or a classification loss function (e.g., a logarithmic loss function).

Figure 6:
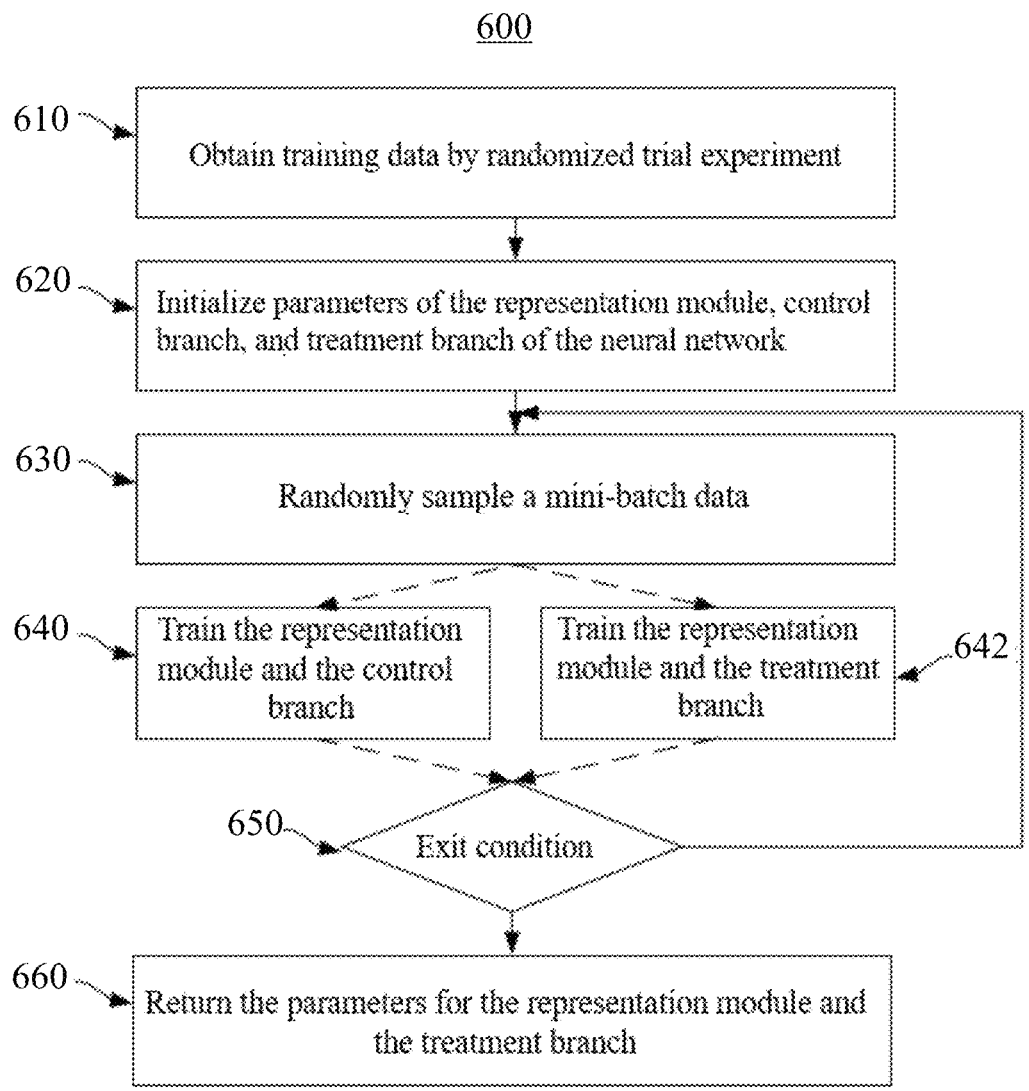
FIG. 6 illustrates an exemplary method for training an uplift inference network for driver program recommendation in accordance with various embodiments.

FIG. 6 illustrates an exemplary method 600 for training an uplift inference network for driver program recommendation in accordance with various embodiments. The method 600 may be used to train the uplift inference network illustrated in FIG. 5. Depending on the implementation, the exemplary method 600 may have more, fewer, or alternative steps as shown in FIG. 6. The steps illustrated in FIG. 6 may be executed in different order, sequentially or in parallel.

In step 610, data samples for training the uplift inference network may be obtained by randomized trial experiments. For example, the data samples may be formulated as control-treatment data set D={(x, t, $\hat{y}$)} with a plurality of triples (x, t, $\hat{y}$). Within the control-treatment data set, some of the triples belong to a control group, and the other triples belong to a treatment group. Both of the control group and the treatment group may comprise a plurality of drivers, where the drivers in the control group do not receive treatments that the drivers in the treatment group receive. In this way, the data collected from the drivers in the control group may be used as a baseline measure, and the data collected from the drivers in the treatment group may be used to, in comparison with the baseline measure, quantify the actual reward (also called uplift) of receiving the treatments. In each triple, x refers to the observed driver's information at a time step, t refers to the time step or other temporal information, and $\hat{y}$ refers to the observed reward (e.g., for the treatment group, the observed reward of recommending a program to the driver; for the control group, the observed reward of not recommending a program to the driver).

In step 620, the representation module, control branch, and the treatment branch of the uplift inference network are initialized with corresponding parameters. Using the denotation of FIG. 5, ($\theta$, $\omega_0$) may be trained together, and ($\theta$, $\omega_1$) may be trained together.

In step 630, from the data samples, a mini batch of data may be selected for training. The selected mini batch of data may include some control group data and some treatment group data, which may be used to train the representation module and the control branch in step 640 and the representation module and the treatment branch in step 642, respectively. For example, in step 640, the parameters ($\theta$, $\omega_0$) may be updated to minimize the loss function in formula (15) using the control group data, and in step 642, the parameters ($\theta$, $\omega_1$) may be updated to minimize the loss function in formula (15) using the treatment group data.

In step 650, the training steps involving steps 630, 640, and 642 may be repeated until an exit condition is met. In some embodiments, the exit condition may comprise a counter (e.g., the repetition terminates when the counter expires), a timer (e.g., the repetition terminates when the timer expires), a convergence monitor (e.g., the repetition terminates when the parameters of the representation module, the control branch, and/or the treatment branch are converged), another suitable exit condition, or any combination thereof.

In step 660, after training the uplift inference network for a predetermined number of iterations, the parameters ($\theta$, $\omega_1$) of the representation module and the treatment branch may be returned. These two sets of parameters may be deemed as the uplift inference network to provide uplift estimations for simulated platform actions generated by the simulator shown in FIG. 3.

FIG. 7 illustrates an exemplary method 700 for constructing a virtual environment for a ride-hailing platform in accordance with various embodiments. The method 700 may be implemented in an environment shown in FIG. 1B and FIG. 2. The method 700 may be performed by a device, apparatus, or system illustrated by FIGS. 1-6, such as the system 102. Depending on the implementation, the method 700 may include additional, fewer, or alternative steps performed in various orders or in parallel.

Block 720 includes obtaining a plurality of historical interaction trajectories each comprising one or more interaction records between a driver and a ride-hailing platform, each interaction record comprising a program recommendation of the ride-hailing platform to the driver and a reaction of the driver in response to the program recommendation.

Block 730 includes training a simulator based on the plurality of historical interaction trajectories, wherein the simulator comprises: a platform policy for generating a plurality of first program recommendations by a virtual ride-hailing platform, a confounding policy for generating a plurality of second program recommendations based on the plurality of first program recommendations and a plurality of confounding variables, and a driver policy for generating a plurality of reactions of a plurality of virtual drivers based on the plurality of first program recommendations and the plurality of second program recommendations, and wherein the plurality of first program recommendations and the plurality of reactions form a plurality of simulated interactions between the plurality of virtual drivers and the virtual ride-hailing platform, and a data distribution of the plurality of simulated interactions approximates a data distribution of a plurality of interaction records in the plurality of historical interaction trajectories.

In some embodiments, the confounding policy and the driver policy are trained jointly as a confounder-driver policy, and the training a simulator comprises: training a discriminator to determine a probability that a state-action pair is from the data distribution of the plurality of interaction records in the plurality of historical interaction trajectories; initializing the platform policy and the confounder-driver policy to form a multi-agent generator; inputting a driver state of a virtual driver to the multi-agent generator to generate a simulated interaction record according to the platform policy and the confounder-driver policy; determining a first state-action pair and a second state-action pair from the simulated interaction record; determining, based on the discriminator and the first state-action pair, a first reward for the platform policy; determining, based on the discriminator and the second state-action pair, a second reward for the confounder-driver policy; and optimizing the platform policy and the confounder-driver policy according to the first reward and the second reward, respectively.

In some embodiments, the training a simulator further comprises: obtaining a simulated interaction trajectory generated by the multi-agent generator; and updating one or more parameters of the discriminator based on the simulated interaction trajectory to minimize a first loss function corresponding to the platform policy and a second loss function corresponding to the confounder-driver policy. In some embodiments, the inputting a driver state to the multi-agent generator to generate a simulated interaction record comprises: generating, according to the platform policy and the driver state, a third program recommendation; generating, according to the confounding policy, a fourth program recommendation based on (1) the driver state and (2) the third program recommendation; generating, according to the driver policy, a reaction of the virtual driver based on (1) the driver state, (2) the third program recommendation, and (3) the fourth program recommendation; and obtaining a simulated interaction record comprising the driver state, the third program recommendation, and the reaction.

In some embodiments, the first state-action pair comprises a first state and a first action; the second state-action pair comprises a second state and a second action, and determining the first state-action pair and the second state-action pair from the simulated interaction record comprises: for the first state-action pair, determining the driver state as the first state, and the third program recommendation as the first action; and for the second state-action pair, determining the driver state and the third program recommendation jointly as the second state, and the reaction of the virtual driver as the second action.

Block 740 includes integrating a reward function with the simulator to construct the virtual environment. In some embodiments, the integrating a reward function with the simulator comprises: obtaining a plurality of control-treatment data sets from randomized trial experiments in the ride-hailing platform; training an uplift inference network based on the plurality of control-treatment data sets, wherein the trained uplift inference network infers a plurality of uplifts corresponding to the plurality of first program recommendations in response to a given driver state, each of the uplifts indicating a reward difference between (1) the virtual ride-hailing platform not making the corresponding first program recommendation in response to the given driver state and (2) the virtual ride-hailing platform making the corresponding first program recommendation in response to the given driver state; and integrating the trained uplift inference network as the reward function with the simulator to construct the virtual environment.

In some embodiments, the control-treatment data set comprises a plurality of treatment data entries and a plurality of control data entries, the plurality of treatment data entries comprising a plurality of rewards for the ride-hailing platform making one or more program recommendations, and the plurality of control data entries comprising a plurality of rewards for the ride-hailing platform not making the one or more program recommendations. In some embodiments, the uplift inference network comprises a feature extraction subnetwork for extracting a plurality of features from an input driver state, and an uplift inference subnetwork for inferring an uplift for a first program recommendation in response to the input driver state. In some embodiments, the uplift inference subnetwork comprises a treatment branch and a control branch, and the training an uplift inference network comprises: training the feature extraction subnetwork and the treatment branch based on the control-treatment data set; and training the feature extraction subnetwork and the control branch based on the control-treatment data set.

In some embodiments, the method 700 may further comprise optimizing a candidate platform policy in the virtual environment by: determining an initial driver state; determining, based on the initial driver state, a simulated interaction between a virtual driver and the virtual ride-hailing platform according to the simulator, wherein the simulated interaction comprises a program recommendation from the virtual ride-hailing platform; determining a reward for the program recommendation from the virtual ride-hailing platform according to the reward function in the virtual environment; optimizing one or more parameters of the candidate platform policy based on the reward; and transitioning the initial driver state to a new driver state based on the simulated interaction. In some embodiments, the initial driver state comprises at least one of following driver features at a time step: gender, age, tenure on the ride-hailing platform, and recent activities on the ride-hailing platform. In some embodiments, the plurality of confounding variables comprise one or more of: location information, weather information, event information, holidays, and a competitor's policy.

In some embodiments, the method 700 may further comprise evaluating a candidate platform policy in the virtual environment by: determining an initial driver state; determining, based on the initial driver state, a simulated interaction trajectory between a virtual driver and the virtual ride-hailing platform according to the simulator; obtaining a plurality uplifts for the plurality of first program recommendations by the virtual ride-hailing platform in the simulated interaction trajectory; and determining a score of the candidate platform policy based on the plurality of uplifts.

Figure 8:
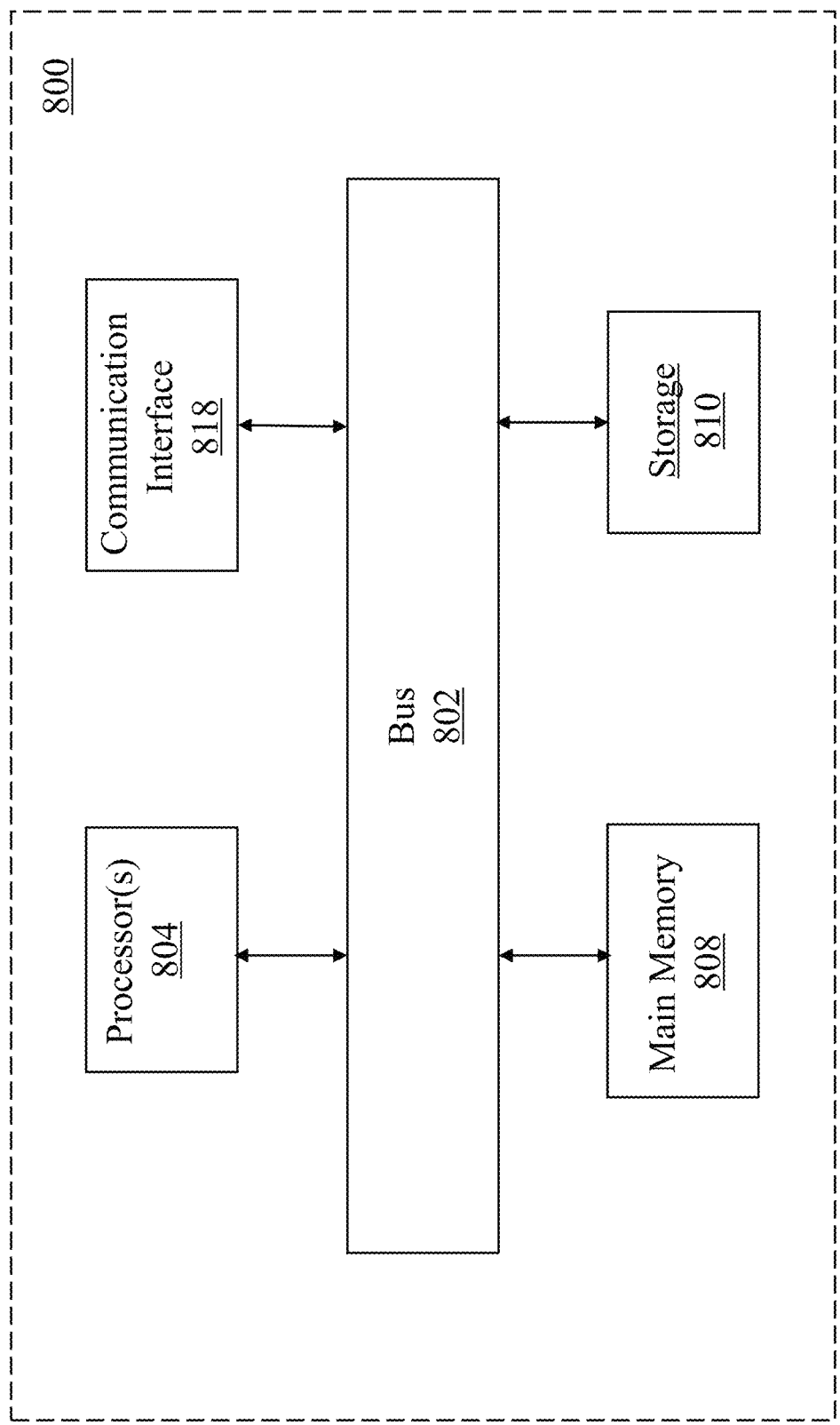
FIG. 8 illustrates a block diagram of a computer system in which any of the embodiments described herein may be implemented.

FIG. 8 illustrates an example computing device in which any of the embodiments described herein may be implemented. The computing device may be used to implement one or more components of the systems and the methods shown in FIGS. 1-7. The computing device 800 may comprise a bus 802 or other communication mechanism for communicating information and one or more hardware processors 804 coupled with bus 802 for processing information. Hardware processor(s) 804 may be, for example, one or more general purpose microprocessors.

The computing device 800 may also include a main memory 808, such as a random-access memory (RAM), cache and/or other dynamic storage devices 810, coupled to bus 802 for storing information and instructions to be executed by processor(s) 804. Main memory 808 also may be used for storing temporary variables or other intermediate information during execution of instructions to be executed by processor(s) 804. Such instructions, when stored in storage media accessible to processor(s) 804, may render computing device 800 into a special-purpose machine that is customized to perform the operations specified in the instructions. Main memory 808 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, or networked versions of the same.

The computing device 800 may implement the techniques described herein using customized hard-wired logic, one or more ASICs or FPGAs, firmware and/or program logic which in combination with the computing device may cause or program computing device 800 to be a special-purpose machine. According to one embodiment, the techniques herein are performed by computing device 800 in response to processor(s) 804 executing one or more sequences of one or more instructions contained in main memory 808. Such instructions may be read into main memory 808 from another storage medium, such as storage device 810. Execution of the sequences of instructions contained in main memory 808 may cause processor(s) 804 to perform the process steps described herein. For example, the processes/methods disclosed herein may be implemented by computer program instructions stored in main memory 808. When these instructions are executed by processor(s) 804, they may perform the steps as shown in corresponding figures and described above. In alternative embodiments, hard-wired circuitry may be used in place of or in combination with software instructions.

The computing device 800 also includes a communication interface 818 coupled to bus 802. Communication interface 818 may provide a two-way data communication coupling to one or more network links that are connected to one or more networks. As another example, communication interface 818 may be a local area network (LAN) card to provide a data communication connection to a compatible LAN (or WAN component to communicate with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

When the functions disclosed herein are implemented in the form of software functional units and sold or used as independent products, they can be stored in a processor executable non-volatile computer readable storage medium. Particular technical solutions disclosed herein (in whole or in part) or aspects that contribute to current technologies may be embodied in the form of a software product. The software product may be stored in a storage medium, comprising a number of instructions to cause a computing device (which may be a personal computer, a server, a network device, and the like) to execute all or some steps of the methods of the embodiments of the present application. The storage medium may comprise a flash drive, a portable hard drive, ROM, RAM, a magnetic disk, an optical disc, another medium operable to store program code, or any combination thereof.

Particular embodiments further provide a system comprising a processor and a non-transitory computer-readable storage medium storing instructions executable by the processor to cause the system to perform operations corresponding to steps in any method of the embodiments disclosed above. Particular embodiments further provide a non-transitory computer-readable storage medium configured with instructions executable by one or more processors to cause the one or more processors to perform operations corresponding to steps in any method of the embodiments disclosed above.

Embodiments disclosed herein may be implemented through a cloud platform, a server or a server group (hereinafter collectively the "service system") that interacts with a client. The client may be a terminal device, or a client registered by a user at a platform, wherein the terminal device may be a mobile terminal, a personal computer (PC), and any device that may be installed with a platform application program.

The various features and processes described above may be used independently of one another or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function but can learn from training data to make a prediction model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet)

and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, "or" is inclusive and not exclusive, unless expressly indicated otherwise or indicated otherwise by context. Therefore, herein, "A, B, or C" means "A, B, A and B, A and C, B and C, or A, B, and C," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The term "include" or "comprise" is used to indicate the existence of the subsequently declared features, but it does not exclude the addition of other features. Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

We claim:

1. A computer-implemented method for constructing a virtual environment for a ride-hailing platform, comprising:
    obtaining a plurality of historical interaction trajectories each comprising one or more interaction records between a driver and the ride-hailing platform, each interaction record comprising a program recommendation of the ride-hailing platform to the driver and a reaction of the driver in response to the program recommendation;
    training a simulator based on the plurality of historical interaction trajectories using reinforcement learning (RL); and
    integrating a reward function with the simulator to construct the virtual environment,
    wherein the simulator comprises:
        a platform policy for generating a plurality of first program recommendations by a virtual ride-hailing platform,
        a confounding policy for generating a plurality of second program recommendations based on the plurality of first program recommendations and a plurality of confounding variables, and
        a driver policy for generating a plurality of reactions of a plurality of virtual drivers based on the plurality of first program recommendations and the plurality of second program recommendations, and
    wherein the plurality of first program recommendations and the plurality of reactions form a plurality of simulated interactions between the plurality of virtual drivers and the virtual ride-hailing platform, and a data distribution of the plurality of simulated interactions approximates a data distribution of a plurality of interaction records in the plurality of historical interaction trajectories, and the confounding policy and the driver policy are trained jointly as a confounder-driver policy, and the training of the simulator comprises:
constructing a multi-agent generator based on the platform policy and the confounder-driver policy;
inputting a driver state of a virtual driver to the multi-agent generator to generate a simulated interaction record according to the platform policy and the confounder-driver policy;
determining a first state-action pair and a second state-action pair from the simulated interaction record;
determining, based on a discriminator and the first state-action pair, a first reward for the platform policy, wherein the discriminator is trained to determine a probability that a state-action pair is from the data distribution of the plurality of interaction records in the plurality of historical interaction trajectories;
determining, based on the discriminator and the second state-action pair, a second reward for the confounder-driver policy; and
optimizing the platform policy and the confounder-driver policy according to the first reward and the second reward, respectively.

2. The method of claim 1, wherein the integrating a reward function with the simulator comprises:
obtaining a plurality of control-treatment data sets from randomized trial experiments in the ride-hailing platform;
training an uplift inference network based on the plurality of control-treatment data sets, wherein the trained uplift inference network infers a plurality of uplifts corresponding to the plurality of first program recommendations in response to a given driver state, each of the plurality of uplifts indicating a reward difference between (1) the virtual ride-hailing platform not making the corresponding first program recommendation in response to the given driver state and (2) the virtual ride-hailing platform making the corresponding first program recommendation in response to the given driver state; and
integrating the trained uplift inference network as the reward function with the simulator to construct the virtual environment.

3. The method of claim 2, wherein the control-treatment data set comprises a plurality of treatment data entries and a plurality of control data entries, the plurality of treatment data entries comprising a plurality of rewards for the ride-hailing platform making one or more program recommendations, and the plurality of control data entries comprising a plurality of rewards for the ride-hailing platform not making the one or more program recommendations.

4. The method of claim 2, wherein the uplift inference network comprises a feature extraction subnetwork for extracting a plurality of features from an input driver state, and an uplift inference subnetwork for inferring an uplift for a first program recommendation in response to the input driver state.

5. The method of claim 4, wherein the uplift inference subnetwork comprises a treatment branch and a control branch, and the training an uplift inference network comprises:
training the feature extraction subnetwork and the treatment branch based on the control-treatment data set; and
training the feature extraction subnetwork and the control branch based on the control-treatment data set.

6. The method of claim 1, further comprising optimizing a candidate platform policy in the virtual environment by:
determining an initial driver state;
determining, based on the initial driver state, a simulated interaction between a virtual driver and the virtual ride-hailing platform according to the simulator, wherein the simulated interaction comprises a program recommendation from the virtual ride-hailing platform;
determining a reward for the program recommendation from the virtual ride-hailing platform according to the reward function in the virtual environment;
optimizing one or more parameters of the candidate platform policy based on the reward; and
transitioning the initial driver state to a new driver state based on the simulated interaction.

7. The method of claim 6, wherein the initial driver state comprises at least one of following driver features at a time step: gender, age, tenure on the ride-hailing platform, and recent activities on the ride-hailing platform.

8. The method of claim 1, wherein the plurality of confounding variables comprise one or more of: location information, weather information, event information, holidays, and a competitor's policy.

9. The method of claim 1, wherein the training the simulator further comprises:
obtaining a simulated interaction trajectory generated by the multi-agent generator; and
updating one or more parameters of the discriminator based on the simulated interaction trajectory to minimize a first loss function corresponding to the platform policy and a second loss function corresponding to the confounder-driver policy.

10. The method of claim 1, wherein the inputting a driver state to the multi-agent generator to generate a simulated interaction record comprises:
generating, according to the platform policy and the driver state, a third program recommendation;
generating, according to the confounding policy, a fourth program recommendation based on (1) the driver state and (2) the third program recommendation;
generating, according to the driver policy, a reaction of the virtual driver based on (1) the driver state, (2) the third program recommendation, and (3) the fourth program recommendation; and
obtaining a simulated interaction record comprising the driver state, the third program recommendation, and the reaction.

11. The method of claim 10, wherein:
the first state-action pair comprises a first state and a first action;
the second state-action pair comprises a second state and a second action, and
determining the first state-action pair and the second state-action pair from the simulated interaction record comprises:
for the first state-action pair, determining the driver state as the first state, and the third program recommendation as the first action; and
for the second state-action pair, determining the driver state and the third program recommendation jointly as the second state, and the reaction of the virtual driver as the second action.

12. The method of claim 1, further comprising evaluating a candidate platform policy in the virtual environment by:
determining an initial driver state;

determining, based on the initial driver state, a simulated interaction trajectory between a virtual driver and the virtual ride-hailing platform according to the simulator;

obtaining a plurality of uplifts for the plurality of first program recommendations by the virtual ride-hailing platform in the simulated interaction trajectory; and determining a score of the candidate platform policy based on the plurality of uplifts.

13. A system comprising one or more processors and one or more non-transitory computer-readable memories coupled to the one or more processors, the one or more non-transitory computer-readable memories storing instructions that, when executed by the one or more processors, cause the system to perform operations comprising:

obtaining a plurality of historical interaction trajectories each comprising one or more interaction records between a driver and a ride-hailing platform, each interaction record comprising a program recommendation of the ride-hailing platform to the driver and a reaction of the driver in response to the program recommendation;

training a simulator based on the plurality of historical interaction trajectories using reinforcement learning (RL); and integrating a reward function with the simulator to construct an virtual environment, wherein the simulator comprises:

a platform policy for generating a plurality of first program recommendations by a virtual ride-hailing platform, a confounding policy for generating a plurality of second program recommendations based on the plurality of first program recommendations and a plurality of confounding variables, and a driver policy for generating a plurality of reactions of a plurality of virtual drivers based on the plurality of first program recommendations and the plurality of second program recommendations, and wherein the plurality of first program recommendations and the plurality of reactions form a plurality of simulated interactions between the plurality of virtual drivers and the virtual ride-hailing platform, and a data distribution of the plurality of simulated interactions approximates a data distribution of a plurality of interaction records in the plurality of historical interaction trajectories, and the confounding policy and the driver policy are trained jointly as a confounder-driver policy, and the training of the simulator comprises:

constructing a multi-agent generator based on the platform policy and the confounder-driver policy;

inputting a driver state of a virtual driver to the multi-agent generator to generate a simulated interaction record according to the platform policy and the confounder-driver policy;

determining a first state-action pair and a second state-action pair from the simulated interaction record;

determining, based on a discriminator and the first state-action pair, a first reward for the platform policy, wherein the discriminator is trained to determine a probability that a state-action pair is from the data distribution of the plurality of interaction records in the plurality of historical interaction trajectories;

determining, based on the discriminator and the second state-action pair, a second reward for the confounder-driver policy; and optimizing the platform policy and the confounder-driver policy according to the first reward and the second reward, respectively.

14. The system of claim 13, wherein the integrating a reward function with the simulator comprises:

obtaining a plurality of control-treatment data sets from randomized trial experiments in the ride-hailing platform;

training an uplift inference network based on the plurality of control-treatment data sets, wherein the trained uplift inference network infers a plurality of uplifts corresponding to the plurality of first program recommendations in response to a given driver state, each of the plurality of uplifts indicating a reward difference between (1) the virtual ride-hailing platform not making the corresponding first program recommendation in response to the given driver state and (2) the virtual ride-hailing platform making the corresponding first program recommendation in response to the given driver state; and integrating the trained uplift inference network as the reward function with the simulator to construct the virtual environment.

15. The system of claim 13, wherein the operations further comprise optimizing a candidate platform policy in the virtual environment by:

determining an initial driver state;

determining, based on the initial driver state, a simulated interaction between a virtual driver and the virtual ride-hailing platform according to the simulator, wherein the simulated interaction comprises a program recommendation from the virtual ride-hailing platform;

determining a reward for the program recommendation from the virtual ride-hailing platform according to the reward function in the virtual environment;

optimizing one or more parameters of the candidate platform policy based on the reward; and transitioning the initial driver state to a new driver state based on the simulated interaction.

16. A non-transitory computer-readable storage medium storing instructions that, when executed by one or more processors, cause the one or more processors to perform operations comprising:

obtaining a plurality of historical interaction trajectories each comprising one or more interaction records between a driver and a ride-hailing platform, each interaction record comprising a program recommendation of the ride-hailing platform to the driver and a reaction of the driver in response to the program recommendation;

training a simulator based on the plurality of historical interaction trajectories using reinforcement learning (RL); and integrating a reward function with the simulator to construct an virtual environment, wherein the simulator comprises:

a platform policy for generating a plurality of first program recommendations by a virtual ride-hailing platform, a confounding policy for generating a plurality of second program recommendations based on the plurality of first program recommendations and a plurality of confounding variables, and a driver policy for generating a plurality of reactions of a plurality of virtual drivers based on the plurality of first program recommendations and the plurality of second program recommendations, and wherein the plurality of first program recommendations and the plurality of reactions form a plurality of simulated interactions between the plurality of virtual drivers and the virtual ride-hailing platform, and a data distribution of the plurality of simulated interactions approximates a data distribution of a plurality of interaction records in the plurality of historical interaction trajectories, and the confounding policy and the driver policy are trained jointly as a confounder-driver policy, and the training of the simulator comprises:
  constructing a multi-agent generator based on the platform policy and the confounder-driver policy;
  inputting a driver state of a virtual driver to the multi-agent generator to generate a simulated interaction record according to the platform policy and the confounder-driver policy;
  determining a first state-action pair and a second state-action pair from the simulated interaction record;
  determining, based on a discriminator and the first state-action pair, a first reward for the platform policy, wherein the discriminator is trained to determine a probability that a state-action pair is from the data distribution of the plurality of interaction records in the plurality of historical interaction trajectories;
  determining, based on the discriminator and the second state-action pair, a second reward for the confounder-driver policy; and
  optimizing the platform policy and the confounder-driver policy according to the first reward and the second reward, respectively.

17. The storage medium of claim 16, wherein the integrating a reward function with the simulator comprises:
  obtaining a plurality of control-treatment data sets from randomized trial experiments in the ride-hailing platform;
  training an uplift inference network based on the plurality of control-treatment data sets, wherein the trained uplift inference network infers a plurality of uplifts corresponding to the plurality of first program recommendations in response to a given driver state, each of the plurality of uplifts indicating a reward difference between (1) the virtual ride-hailing platform not making the corresponding first program recommendation in response to the given driver state and (2) the virtual ride-hailing platform making the corresponding first program recommendation in response to the given driver state; and
  integrating the trained uplift inference network as the reward function with the simulator to construct the virtual environment.

* * * * *